United States Patent [19]
Omata et al.

[11] Patent Number: 5,067,160
[45] Date of Patent: Nov. 19, 1991

[54] MOTION-PATTERN RECOGNITION APPARATUS

[75] Inventors: Satoshi Omata, Machida; Hiroshi Shimizu; Yoko Yamaguchi, both of Tokyo, all of Japan

[73] Assignee: Canon Kabushiki Kaisha, Tokyo, Japan

[21] Appl. No.: 328,547

[22] Filed: Mar. 24, 1989

[30] Foreign Application Priority Data

Apr. 26, 1988 [JP] Japan .................. 63-102920

[51] Int. Cl.$^5$ .............................................. G06K 9/00
[52] U.S. Cl. ........................................ 382/1; 382/8; 382/17; 382/1; 358/105
[58] Field of Search ............ 382/1, 17, 8, 21, 29; 358/105

[56] References Cited

U.S. PATENT DOCUMENTS 4,710,964 12/1987 Yamaguchi et al. ................ 382/17

OTHER PUBLICATIONS

"Principle of Holonic Computer and Holovision" in Journal of the Institute of Electronics, Information and Communication, vol. 70, No. 9, pp. 921–930 (1987), Shimizu et al.

"Holonic Model of Motion Perception", IEICE Technical Reports, 3/26/88, pp. 339–346, Omata et al.

"Entrainment of Two Coupled van der Pol Oscillators by an External Oscillation", in Biological Cybernetics, vol. 51, pp. 225–239 (1985), Ohsuga et al.

Primary Examiner—Michael Razavi
Attorney, Agent, or Firm—Fitzpatrick, Cella, Harper & Scinto

[57] ABSTRACT

The apparatus recognizes a motion of an object which is moving and is hidden in an image signal, and discriminates the object from the background within the signal. The apparatus has an image forming unit comprising non-linear oscillators, which forms an image of the motion of the object in accordance with an adjacent-mutual-interference-rule, on the basis of the image signal. A memory unit, comprising non-linear oscillators, stores conceptualized meanings of several motions. A retrieval unit retrieves a conceptualized meaning close to the motion image of the object. An altering unit alters the rule, on the basis of the conceptualized meaning. The image forming unit, memory unit, retrieval unit and altering unit form a holonic-loop. Successive alterations of the rules by the altering unit within the holonic loop change an ambiguous image formed in the image forming unit into a distinct image.

26 Claims, 16 Drawing Sheets

MOTION-PATTERN RECOGNITION APPARATUS

BACKGROUND OF THE INVENTION

1. Field of the Invention

The present invention relates to an apparatus which is arranged to recognize the motion of an object contained in an image signal which is mechanically read out, as well as to an image extracting apparatus capable of discriminating between unnecessary information (such as the "background" contained in an image signal) and useful information (such as a "moving object" hidden in the background) to extract the useful information alone. More specifically, the present invention relates to a system for extracting a "meaningful" object from input image data or carrying out measurement of the number, the dimensions, the area, etc. of the extracted "meaningful" object or for effecting pattern processing to discriminate between an object and any matter other than the object in input image data on the basis of the feature of the object, thereby classifying them into separate categories. In addition, the present invention relates to a holonic computer.

2. Description of the Related Art

In a wide range of industrial fields, there has recently been a strong demand for information processing systems for extracting useful (or meaningful) data from a large amount of input data such as input motion-image data or for selectively processing a specific object contained in a large amount of input data. This demand has been increasing in a situation in which, although image data obtained through, e.g. a camera is the most easily available, it is difficult to avoid the problem that the obtained data necessarily contains, in its primitive form, a large amount of unorganized and meaningless information.

FIG. 23 shows in block form a so-called pattern processing system or pattern measuring system which has heretofore been reduced to practice. The illustrated conventional type of pattern processing system is generally constituted by an input section 200, a processing section 201, a memory section 202, and an output section 203. The primary recent trend in such a conventional arrangement is to use a digital computer as the processing section 201. The input section 200 is arranged to divide an input image signal into a multiplicity of parts, for example, break down an input motion image into fine picture elements, and transfer the divided parts to the processing section 201 for data-processing purposes. The processing section 201 incorporates a method which comprises the steps of computing and extracting various kinds of features of all the input data, retrieving a feature inherent in an object, and identifying the object of interest. In addition, the processing section 201 compares the feature obtained by a combination of such partial features and the feature of the entire object stored in the memory section 202, thereby implementing recognition of the object.

Basically, the conventional process described above is performed by using all local data contained in an input image. However, it has also been common practice to adopt information compression techniques, for example, a method of regularly eliminating input information in order to reduce the amount of information to be processed, or a method of reducing the amount of hardware used for process execution and representing input information in a multiplexed form in order to achieve a more rapid process. The use of the information compression techniques contemplates the overall enhancement of processing efficiency. Furthermore, to meet industrial demands in which an increase in the speed of processing of an enormous amount of complicated data is primarily desired, on the assumption that the above-described arrangements and methods are used, the prior arts have proposed increases in the operating speed and the capacity of hardware which constitutes parts of the system, and modifications of the algorithms used in a process such as an arithmetic-logic process and a retrieving process, as well as specialization techniques such as restriction of the range of an object which is derived from information to be treated and specification of the kind of object.

In such conventional types of processing techniques, however, it is impossible to avoid shortcomings such as increases in the scale and the price of hardware, restrictions imposed upon processing speed due to the limitations of hardware techniques, and the deterioration of resolution resulting from an increase in processing speed. In addition, it has been difficult to recognize the "overall feature" of an input image including a figure of complicated form or a plurality of patterns by using the conventional method in which a simple combination of local data ("partial feature") is regarded as "overall feature", since the conventional method cannot identify the "overall feature" by means of the simple combination of "partial feature".

This suggests that, in order to extract meaningful information and eliminate unnecessary information from physical signals representing a motion image, it is necessary to develop a "motion recognition apparatus" having a novel structure based on a new technical concept. In other words, in order to eliminate unnecessary information from an image signal containing a large amount of unwanted information, it is first of all necessary to extract the overall "meaning" of the image from the image signal and, if the extraction is accomplished, it will then be possible to determine, on the basis of the overall "meaning", whether or not the image signal is useful.

SUMMARY OF THE INVENTION

It is, therefore, an object of the present invention to provide a motion recognition apparatus having a novel structure which is capable of extracting the overall "meaning" of an image from an input image signal.

It is another object of the present invention to provide an apparatus arranged to discriminate between useful information and useless information in an input image signal by extracting the overall "meaning" of the image represented by the input image signal and then to select the useful information and eliminate the useless information, thereby effecting information compression.

It is another object of the present invention to provide an apparatus arranged to recognize a "meaningful" object which is in motion in the image represented by an input image signal and to detect the number of objects, the size of the object, or the area occupied by the object in the image.

It is another object of the present invention to provide an apparatus having an arrangement in which information processing for storage and recognition of information is implemented as a dynamic coupling of holonic elements or nonlinear oscillator circuits.

It is another object of the present invention to provide a recognition apparatus having an arrangement in which a set of bit information for forming an image is constructed in the form of a cube, information processing of the image formed by the cube being implemented by a holonic loop.

OVERALL DESCRIPTION OF THE INVENTION

In general, it is understood that the recognition process of living things is the discovery of meanings of their own in the world of external signals having a variety of meanings. That is to say, what a living thing "sees" (a physical signal from the outside world) is not necessarily identical to what the living thing "can see" (an inner image in the brain), and it is therefore considered that the brain performs a process of discriminating between parts to which meaning is to be attached ("an object") and parts to which no meaning is to be attached ("background").

Figure 1:
FIG. 1 is a view which serves to illustrate the way of recognizing the motion of an object in a motion image, which is the primary object of the present invention.

The recognition of a motion image (visual motion) will now be considered with reference to FIG. 1. FIG. 1 shows a spotted "dog" which stands against a spotted "background". If this dog is not moving, it would be difficult to recognize the fact that the dog is present in the picture. However, if the dog starts to move, it will be possible to discriminate between the spotted pattern of the dog and the spotted pattern of the background with stereoscopic reality, and hence to recognize the presence of the "dog" which is distinguishable from the background. According to certain findings of cerebrophysiology, it is said that a living thing can sense the reality of a scene by virtue of the simultaneous execution in its brain of a process of finding out a "relationship" present between the vectors of the signals input to its retinas (for the case where a variation in an image is represented by a vector) and a process of finding out the "relationship" between the meaning of "dog" held in its memory and the "meaning" extracted from the input vectors. On the basis of this finding, the inventors of the present invention propose the computerization of this visual information processing system of living things, that is, a holonic computer. The term "holon" (or holonic element) is defined as an "autonomous element having the ability to cooperatively self-organize its state of time space order in an entire system on the basis of a physical reason", and it is presumed that the dynamics of a group of such elements is governed by physical laws. The present inventors have realized the computerization of the above visual information processing system by substituting nonlinear oscillator circuits (e.g. Van del Pol oscillator circuits) for holonic elements.

Figure 2:
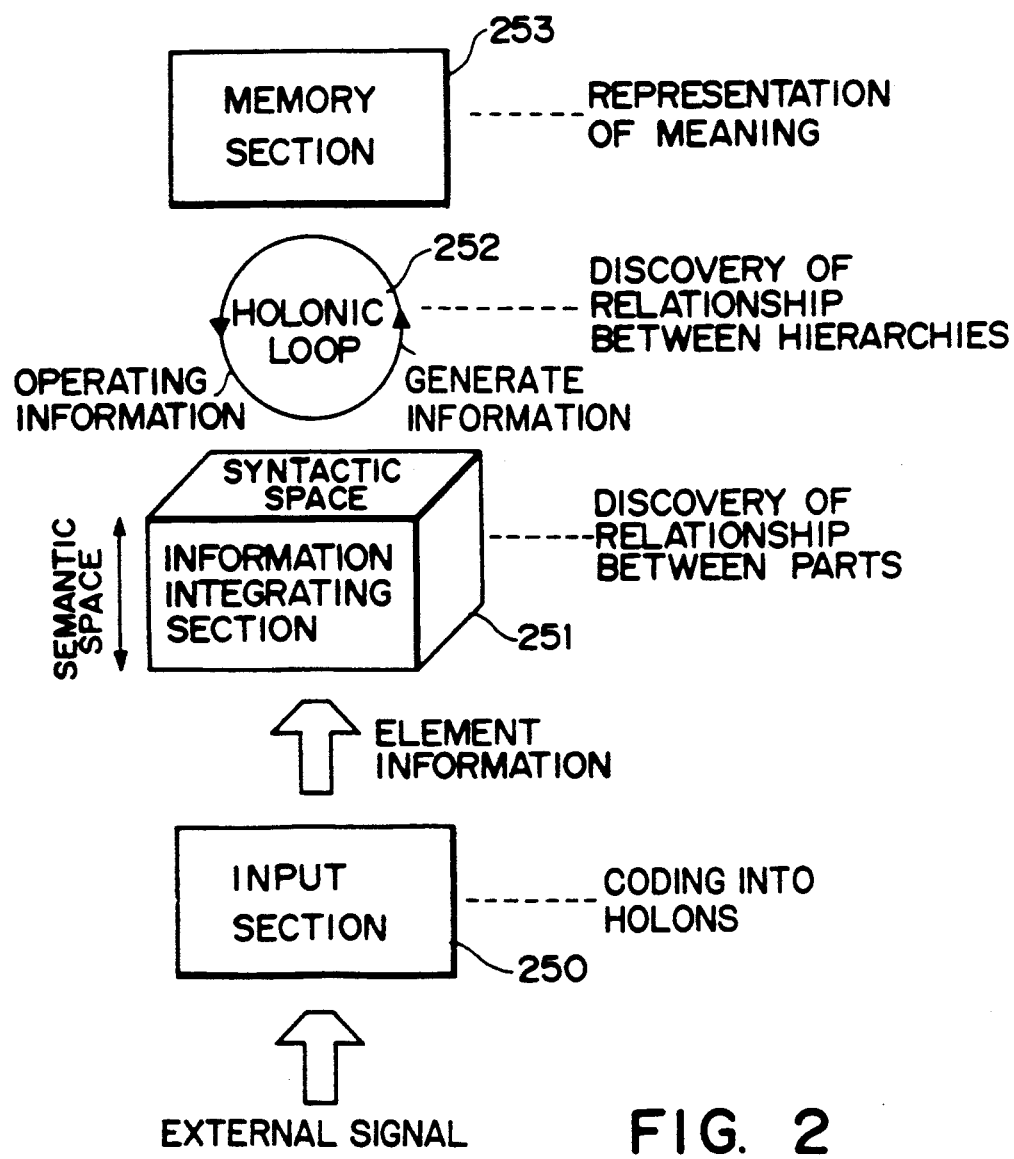
FIG. 2 is a block diagram which serves to illustrate the basic construction of the present invention.

Such a living thing, more specifically, the visual information process executed by the living thing is modeled as a holonic computer which serves as a "system which discovers a relationship for itself", as shown in FIG. 2. The model shown in FIG. 2 represents the basic concept of the present invention. In this model, incoming image signal data from the outside world is first input into an input section 250, where the data is broken down into an array of dots and coded to holons. The holons are shown as "element information" in FIG. 2. An information integrating section 251 is composed of a multiplicity of holons and serves not only to map the outside world in a syntactic space in one-to-one correspondence but also to expand a semantic space which includes the inner states of a number of holons, thereby presenting semantic diversity. The information integrating section 251 accomplishes the discovery of the "interrelationship" between the holons by utilizing a "local interaction" between the holons (this interaction is represented by the "cooperation" and the "competition" between the holons). In order to describe such a relationship, the concept of "the amount of activity" of holon is introduced. More specifically, the process of discovery of the "interrelationship" mentioned above means that the "interaction" by which holons that bear an appropriate relationship reciprocally strengthen their activities, while holons that bear an inappropriate relationship reciprocally weaken their activities, is brought about under certain "local rules". Therefore, the inner states of the holons (the diversity of the meaning) are compressed into one, and each relationship between holons is self-organically determined as a pattern of the amount of activity.

However, the relationship which is determined by the "local interaction" is merely a partial one. Thus, in order to discover the "overall relationship", exchanges of information are made between the information integrating section 251 and a memory section 253. More specifically, the information generated in the information integrating section 251 is indicative of a partial relationship, while the information represented by the memory section 253 is indicative of the "overall relationship", which differs in logic hierarchy from the information generated by the information integrating section 251. Grasping this "overall relationship" serves to enable grasping of a concept in the process of recognition, that is, grasping of semantic information which represents prior understanding. In the memory section 253, only information which bears an appropriate relationship to the input information (referred to as "generated information" ) supplied from the information integrating section 251 is called up under a certain "global rule", and the information called up is fed back to the information integrating section 251 as "operating information". In other words, in the information integrating section 251, the "local rules" which govern the information integrating section 251 are altered in accordance with the "operating information", whereby the relationship between the holons is altered. Thus, the discovery of the relationship between hierarchies each having a different quality is carried out through the self. organic compression and integration of information by means of the feedback loop established between the information integrating section 251 and the memory section 253. In this manner, an "inner image" (hereinafter referred to simply as "image" ) for input signals is formed in the information integrating section 251 through the autonomic discovery of the "relationship between parts" and the "relationship between parts and the whole", whereby the "meaning" of the "image" is represented in the memory section 253.

DESCRIPTION OF THE PREFERRED EMBODIMENT

A preferred embodiment of the present invention in which the conceptual model shown in FIG. 2 is embodied as an image processing apparatus by engineering means will be explained below with reference to the accompanying drawings.

Construction of Image Processing Apparatus

Figure 3:
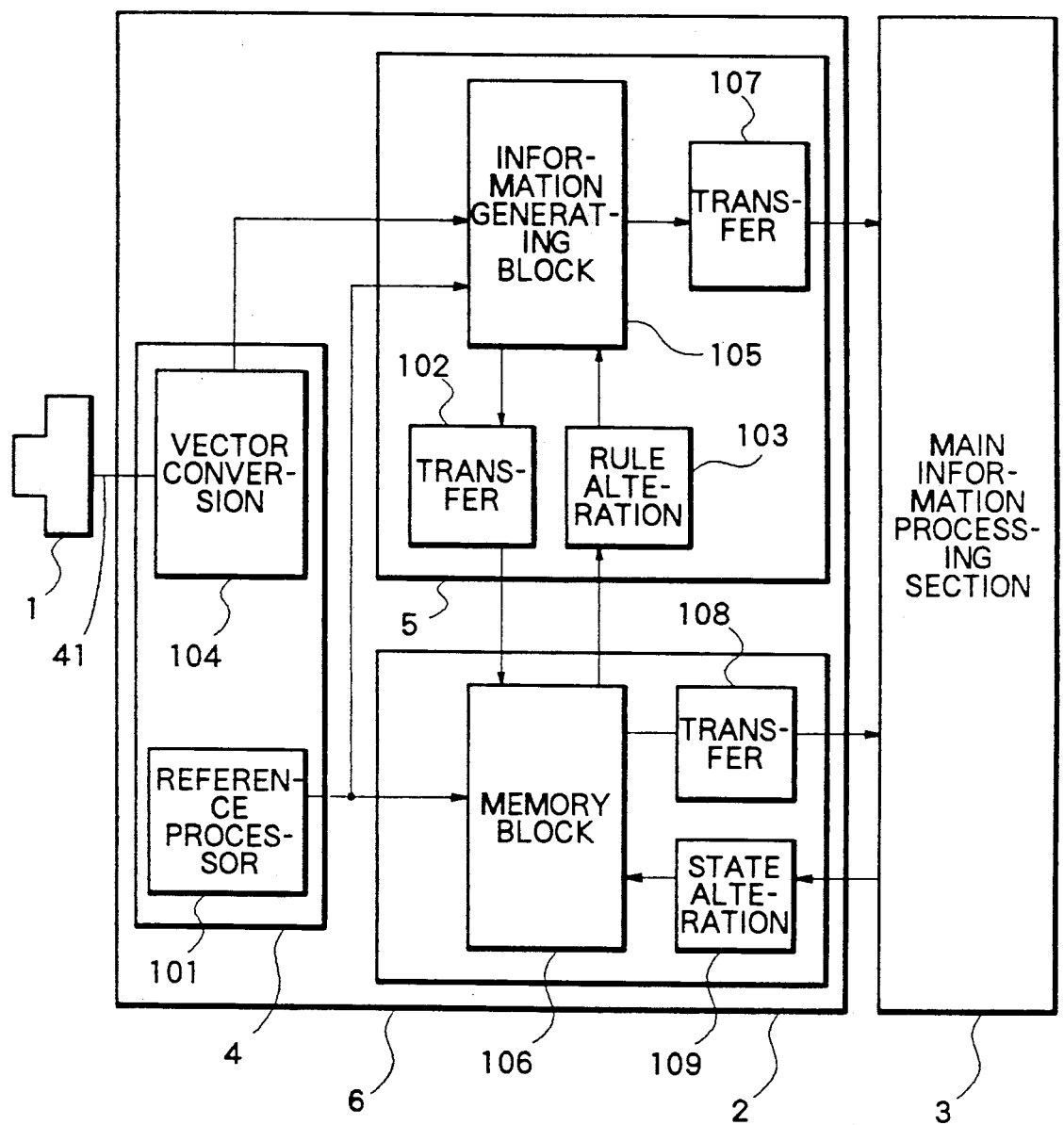
FIG. 3 is a block diagram showing the overall construction of an image processing apparatus according to a preferred embodiment of the present invention.

FIG. 3 is an overall view showing in block form a preferred embodiment of an image processing apparatus in which the "recognition of a motion image" according to the present invention is applied to image processing. The image processing apparatus shown in FIG. 3 is arranged to grasp an "image" and the "meaning of the image" such as those explained in connection with FIG. 2 from image signal data input from a camera or the like, extract a useful part (corresponding to the image data representing the "dog" shown in FIG. 1) as an "object" from the image signal data on the basis of the "image" and the "meaning of the image", and subject the extracted part to predetermined image processing (for example, a process of measuring the number or size of the object).

Figure 24:
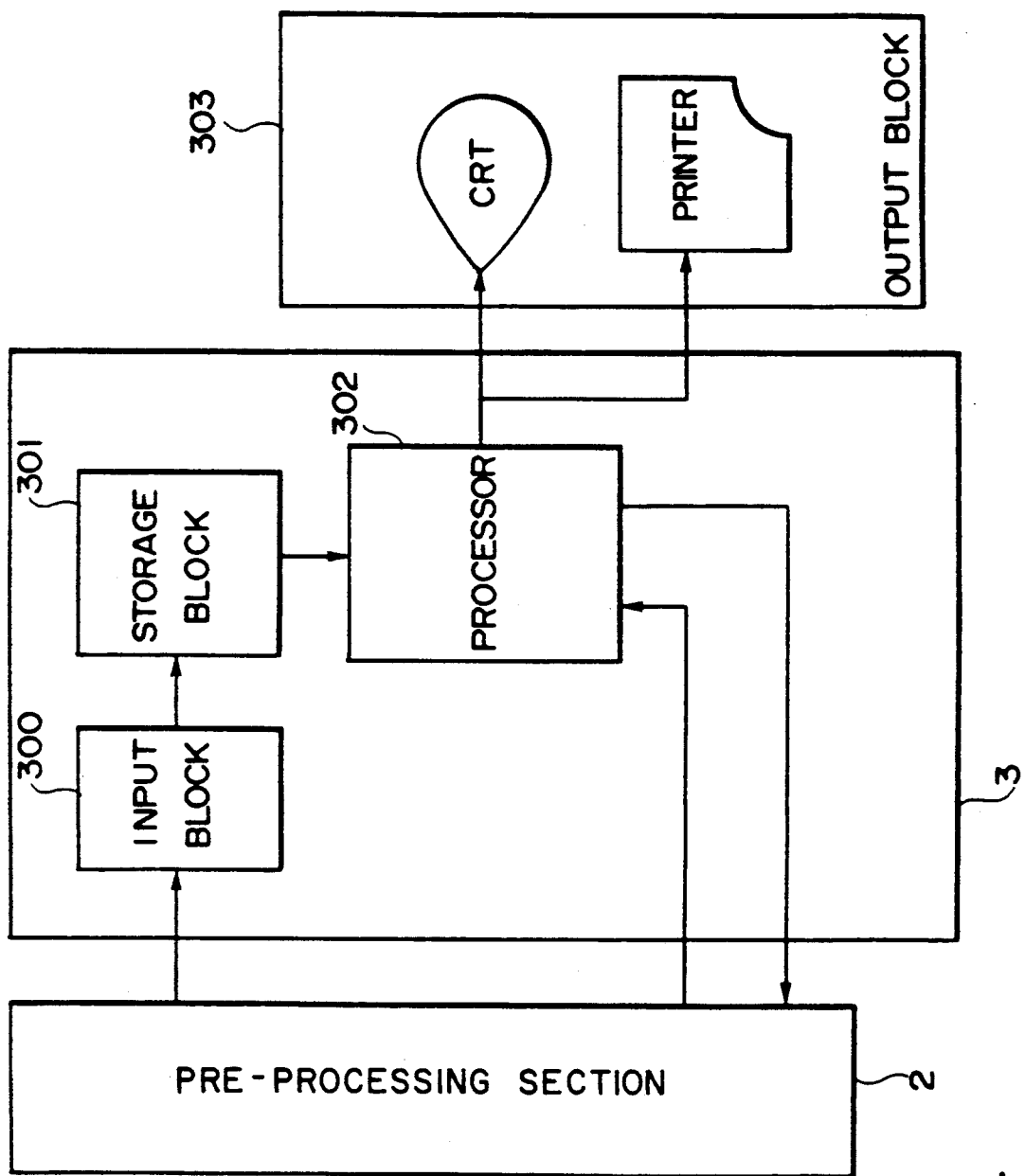
FIG. 24 is a block diagram of a main information processing block.

In FIG. 3, reference numeral 1 denotes an input section which includes a sensor serving to input image information, and reference numeral 2 denotes a preprocessing section for effecting the aforementioned process of extracting a useful part from the input image information. The preprocessing section 2 is constituted by a coding section 4, an information generating section 5, and a memory section 6. The memory section 6 largely corresponds to the memory section 253 shown in FIG. 2. Reference numeral 3 denotes a main information processing section which is constituted by a computer system and which serves to effect the above. described predetermined image processing. As shown in FIG. 24, the main information processing section 3 includes an input block 300 which inputs the featured data of the visual motion information which has been processed by the preprocessing section 2; a memory block 301 which stores the featured data from the input block 300; a processor 302 which processes, transfers or searches the featured data from the memory block 301; and an output block 303 visually outputs the featured data or data corresponding thereto which has been processed in the processor 302. In one sense, the processing executed by the preprocessing section 2 corresponds to preprocessing for the main information processing section 3, but the processing executed by the main information processing section 3 is known in itself; rather, the feature of the present invention resides in the construction of the preprocessing section 2 and the organic connections between the preprocessing section 2 and the main information processing section 3. The input section 1 has a camera which receives a picture signal which contains an object and outputs a corresponding video signal 41.

The information generating section 5 is constituted by an information generating block 105, a transfer block 102 for transferring to the memory section 6 the information generated by the information generating block 105, a transfer block 107 for transferring the same generated information to the main information processing section 3, and a rule altering block 103 for altering processing rules (the aforesaid local rules) in the information generating block 105. The information generating section 5 may be regarded as a section corresponding to the information integrating section 251 of FIG. 2. The memory section 6 is constituted by a memory block 106 which stores the meanings of an "image" in advance, a transfer block 108 for transferring information representing the "state" of the memory section 6 to the main information processing section 3, and a state altering block 109 for altering the inner "state" of the memory block 106. The coding section 4 has a vector conversion block 104 for disintegrating the input video signal 41 and transferring the disintegrated signal to the information generating block 105 and a reference supplying block 101 for supplying a disintegrating reference to both the information generating block 105 and the memory block 106. The term "reference" has the following meaning. As will be described later, in the information generating block 105 and so on, information is represented by the amplitude and the phase of each nonlinear oscillator, and the "reference" of the reference supplying block 101 means a "reference" as to the amplitude and the phase, because, in the present apparatus, information is represented in the terms of the phase of an oscillation as its content and the amplitude as its intensity.

Outline of Operation of Image Processing Apparatus

The functions realized by the overall image processing apparatus are as follows:

(1) the function to divide incoming image signal data, that is, motion image signal data into mesh-like parts and extract only a part or parts which are useful for the preprocessing section 2, that is to say, the function to extract the feature of each picture element which pertains to a particular motion pattern;

(2) the function to transfer to the main information processing section 3 the image information whose amount is reduced by the function (1) and carry out normal computerized motion-image processing, thereby enabling high-speed measurement and processing of the motion image; and (3) the function to provide the main information processing section 3 with the result obtained by image processing which allows for both the feature of each part of the image signal data input to the input section 1 and a motion pattern which is specified as the overall feature or stored in advance by the main information processing section 3.

The operation of the whole of the image processing apparatus of FIG. 3 will now be explained. A picture signal is input to the input section or camera 1 and transferred to the vector conversion block 104 of the preprocessing section 2 as the video signal 41 which represents luminance in units of frames. Although the processing executed in the preprocessing section 2 will be described later in more detail, the vector conversion block 104 divides the image signal data for each frame into mesh-like elements each of which constitutes a picture element, and extracts a vector representing the direction of luminance variation between picture elements located at the same positions in two frames. More specifically, the direction of luminance variation extracted, as vector, from the difference between picture element signal of a frame and a picture element signal of the next frame reflects the motion of a part of an object which is being recognized. These vectors are transferred to the information generating block 105. The information generating block 105 extracts an "image" from the transferred vectors and the transfer block 102 then transfers the "image" to the memory block 106. Incidentally, the information generating block 105 not only stores the vectors supplied from the vector conversion block 104 but also effects processing in accordance with predetermined rules which will be described later so as to form the "image".

The memory block 106 compares the transferred "image" with the motion patterns (or "meanings") which are stored in advance in the memory block 106 and feeds the result back to the information generating block 105 through the rule altering block 103. In this case, to feed back is to amend the aforesaid rule in accordance with that result. More specifically, the information generating block 105 optimizes the "image" of the vector input in accordance with new rules altered by the rule altering section 103 in order to make even more appropriate the relationship between the partial features represented by the respective picture elements (that is, a "local relationship"). The transfer block 102 causes the memory block 106 to recall a motion pattern which has the highest correlation with the feature of the whole of the newly optimized "image".

The above-described feedback loop of the information generating block 105→the transfer block 102→the memory block 106→the rule altering block 103→the information generating block 105→. . . corresponds to the "holonic loop" explained in connection with FIG. 2. More specifically, the "image" representing the "local relationship", generated by the information generating block 105, is re-grasped in the form of a "conceptualized meaning" stored in the memory block 106, and a more local "image" is reconstructed from the re-grasped "conceptualized meaning" through the feedback loop. This loop of "image" →"conceptualized meaning"→"image"→"conceptualized meaning"→. . . makes more accurate the extraction of useful parts contained in the input motion image signal. That is to say, it becomes possible to extract only image information (for example, the "dog" of FIG. 1) which is recognized to pertain to a particular motion pattern (for example, the forward movement of the "dog" of FIG. 1). The foregoing is the outline of the processing executed by the preprocessing section 2.

The "image" of the vector which has been extracted and processed as described above in the preprocessing section 2 is transferred as a binary-coded signal to the main information processing section 3 by the transfer block 107 where normal motion-image measurement such as measurement of the position and size of the object, storage processing of the obtained data or visualizing processing is effected if necessary. Also, the information (the meaning of the "image") stored in the memory block 106 is transferred as a binary-coded signal to the main information processing section 3, where the motion pattern of the input motion image can be processed.

As will be described later, in the presently preferred embodiment, by way of example, "motion patterns" (that is, the "meanings" of recognized motions) are simplified with the following four kinds: "clockwise rotation CW", "anticlockwise rotation ACW", "expansion EXP", and "reduction RED". For example, if both an anti-clockwise rotating object and expanding object are included in input image signal data, it is possible to extract "ACW" image in a certain case, and it is further possible to extract "EXP" image in another case. This is because the main information processing section 3 can specify a motion pattern to be extracted by altering parameters in the memory blocks 106 by means of the state altering block 109. Such a function makes it possible to extract images, each having a different motion pattern, from input vectors including a plurality of different motion patterns.

Pre-Processing Section

As described above, the function to form an "image" from image signal data, attach a "meaning" to the "image", and extract useful information alone from the image signal data primarily depends upon the preprocessing section 2. The structure and operation of the preprocessing section 2 will therefore be described in more detail.

Figure 4:
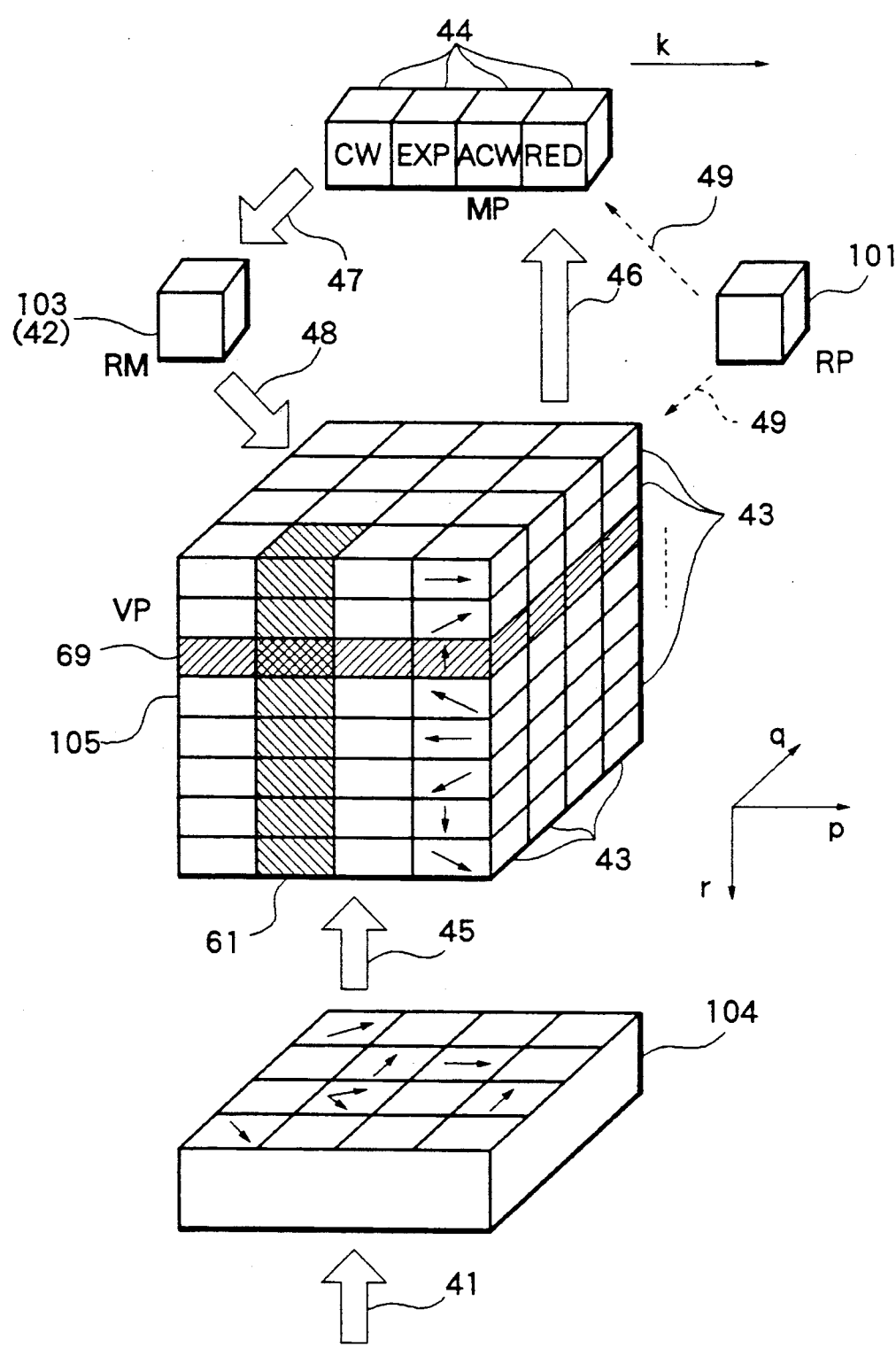
FIG. 4 is a block diagram showing as a holonic model the construction of the preprocessing section used in the embodiment of FIG. 3.

FIG. 4 is a block diagram which serves to illustrate the construction of the preprocessing section 2. In the figure, the portion shown as VP (vector processor) is the information generating block 105 and corresponds to the information integrating section 251 of FIG. 2. The portion shown as MP (memory processor) is the memory block 106 of FIG. 3 and corresponds to the memory section 253 of FIG. 2. The portion shown as RP (reference processor) is the reference supplying block 101 of FIG. 3, and the portion shown as RM (rule modifier) is the rule altering block 103 of FIG. 3. The loop of VP→MP→RM→VP, shown in FIG. 4, is equivalent to the "holonic loop" of FIG. 2 and the "feedback loop" of FIG. 3. Reference numeral 104 denotes a vector conversion block for converting the incoming video signal or luminance signal 41 for each frame into a vector input 45 and then for supplying the vector input 45 to the information generating block 105. In FIG. 4, each element shown as a solid except for the vector conversion block 104 represents a processor element constituted by a nonlinear oscillator. In other words, the connections between the main blocks of the preprocessing section 2 shown in FIG. 3 are implemented as the dynamic connection machine of the nonlinear oscillators.

As shown in FIG. 4, the construction of the information generating block 105 is such that processor elements 43 are disposed in a cubic form. The memory block 106 is constituted by four processor elements 44, each of which receives the output 46 of the information generating block 105. The output 47 of the memory block 106 acts to alter the processing rules in the information generating block 105 by means of a rule altering processor element 42.

The following is a description of the processor elements each of which includes a nonlinear oscillator, etc. constituting a processing unit of each block.

Processor Element

Figure 5:
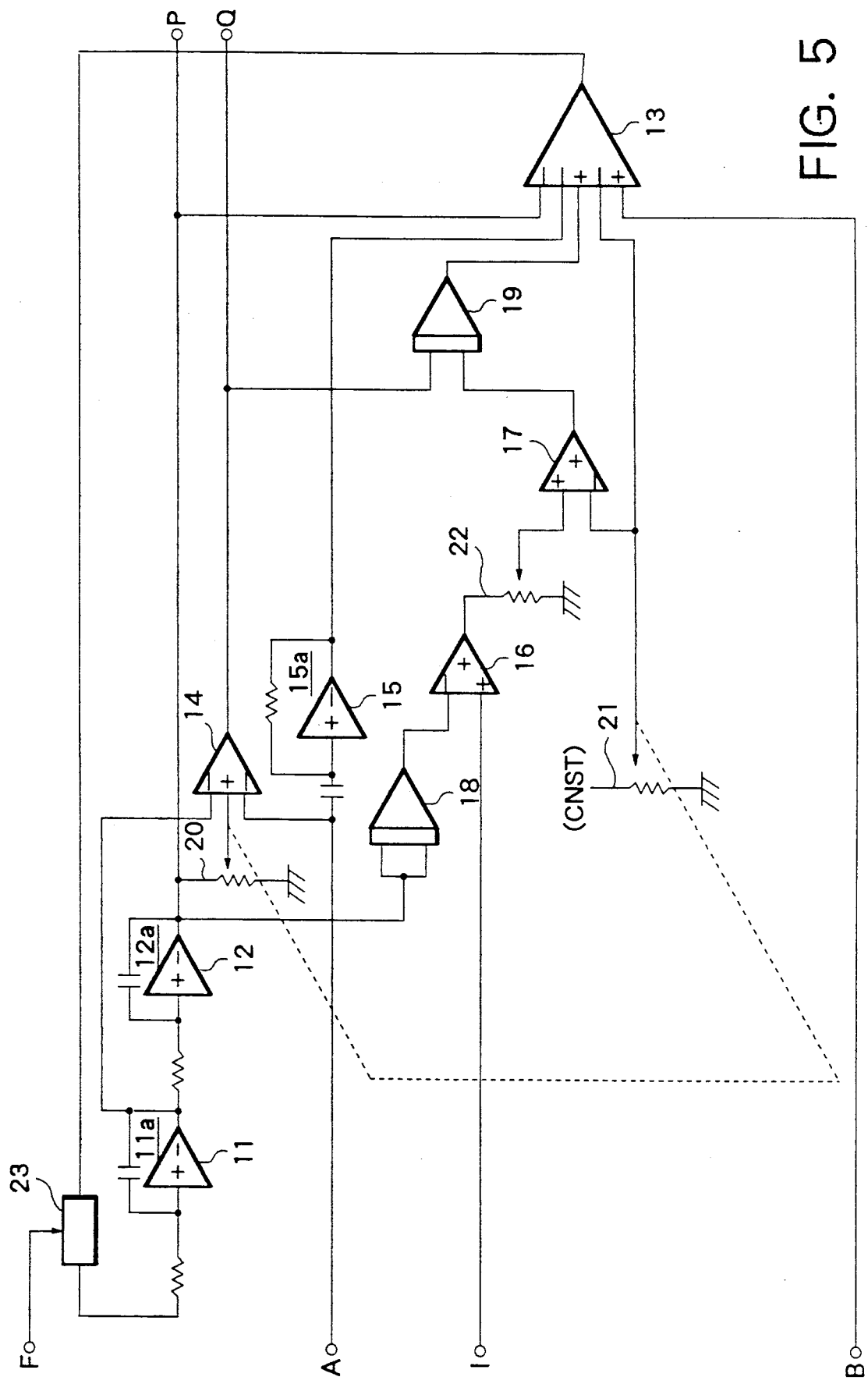
FIG. 5 is a circuit diagram showing a Van del Pol oscillator circuit used in each processor element of the present embodiment apparatus.

Each of the aforesaid information processing block VP 105 and the memory block MP 106 is constituted by processor elements each of which includes at least a nonlinear oscillator circuit. FIG. 5 shows the construction of the circuit of the oscillator unit used in each processor element.

It is well known that each nonlinear oscillator circuit OSC is constituted by a Van del Pol oscillator circuit which is assembled with resistors, capacitors, induction coils, and negative resistance devices such as Esaki diodes. In FIG. 5, reference numerals 11 to 17 denote operational amplifiers, and symbols + and − represent the polarities of the input and output signals of each corresponding operational amplifier 11 to 17. Each of the operational amplifiers 11 and 12 is connected to corresponding ones of the illustrated resistors and capacitors so as to constitute an integrator 11a or 12a. The operational amplifier 15 is connected to corresponding ones of the illustrated resistors and capacitors so as to constitute a differentiator 15a. Each of the other operational amplifiers 13, 14, 16 and 17 is connected so as to corresponding one of the illustrated resistors and capacitors to constitute an adder. Multipliers 18 and 19 as well as variable resistors 20 to 22 are disposed, and the variable resistors 20 and 21 are arranged to operate in an interlocked relationship.

Figure 6:
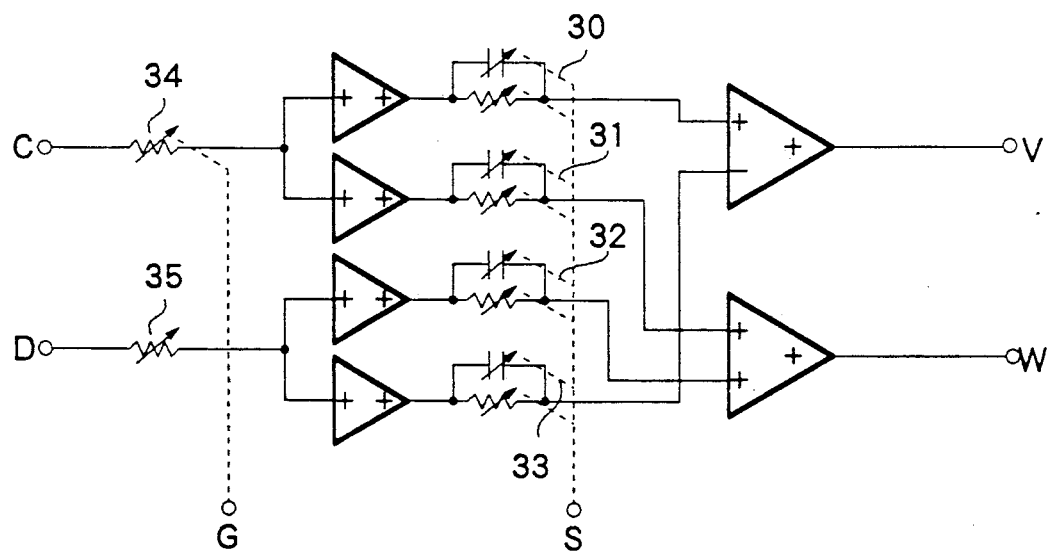
FIG. 6 is a circuit diagram showing a phase shift circuit used in each processor element of the present embodiment apparatus.
Figure 16:
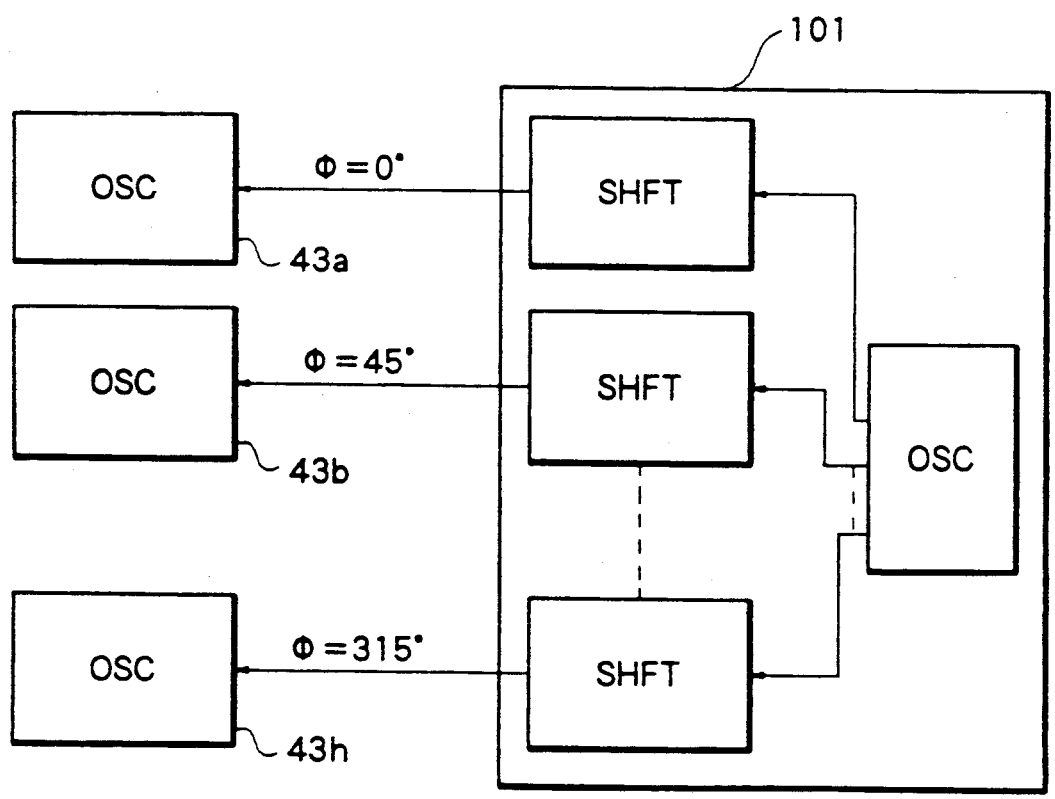
FIG. 16 is a block diagram showing hardware for implementing inter-hypercolumn mutual interference.

RP 101 is composed of a non.linear oscillator and several phase shift circuits, as shown in FIG. 16. A phase shift circuit SHFT such as that shown in FIG. 6 is used in order to intentionally shift the phase of the output of the oscillator circuit of RP 101 and supply the result phase reference to another oscillator circuit such as of VP 105. More specifically, the outputs P and Q of the oscillator circuit OSC are input to the terminals C and D of the phase shift circuit SHFT, respectively. The outputs of the phase shift circuit SHFT are provided at its outputs V and W. In a phase shift circuit SHFT of RP 101, if capacitors 30 to 33 are adjusted in an interlocked relationship, then the phase of the output oscillation of another oscillator circuit OSC connected to the aforesaid phase shift circuit SHFT can be arbitrarily shifted. In addition, it is possible to control the intensity of the interference input by adjusting the variable resistors 34 and 35 in an interlocked relationship.

The oscillator circuit OSC of each processor element of VP 105, RP 101, MP 106 or RM 103 is arranged so that the "content of information" is represented by the phase or the frequency of oscillation with the "intensity of information" represented by the amplitude of oscillation. In addition, "processing of information" is, in the present model of FIG. 4, realized by changing the phase, the frequency or the amplitude of oscillation through the phase shift circuit SHFT (or a amplifier, if necessary) on the basis of, for example, interference among the oscillator circuits. Specifically, the present embodiment utilizes, as a basic mode for information processing, a phenomenon called "entrainment" which is caused by making the oscillator circuits OSC interfere with one another. The "entrainment" is a phenomenon similar to resonance and indicates the phenomenon that, even if the proper frequencies of a plurality of oscillator circuits OSC which interfere with one another are not equal during an initial period, when a predetermined time period has passed, then all the oscillator circuits start to interfere with one another to produce oscillation of the same frequency, amplitude and phase. In addition, by interposing the phase shift circuit SHFT between adjacent oscillator circuits OSC, it is also possible to arbitrarily set the phase difference between the output signals of the oscillator circuits OSC which have been "entrained".

Incidentally, the processor elements do not necessarily need the phase shift circuit SHFT therebetween, and may be disposed when it is necessary to shift the phase of the output of the oscillator circuit OSC intentionally. As will be described later, connections of RP 101 with VP 105 and MP 106 are made by SHFT (Refer to FIG. 16). On the other hand, the processor elements of VP 105 are connected with each other by amplifiers. See FIGS. 9, 11, 12. The processor elements of MP 106 are connected with each other by amplifiers. See FIG. 20.

As is well known, nonlinear oscillator circuits proceed to another stable oscillating state in accordance with the current state of their oscillation systems and input signals. Especially, because of the aforesaid "entrainment effect", the operation of the Van del Pol oscillator circuit can approximate to memorizing operation and "recalling" of memory in the brains of living things. The analysis of a Van del Pol oscillator is described in, for example, the document published by some of the present inventors, "Entrainment of Two Coupled Van del Pol Oscillators by an External Oscillation" (Biological Cybernetics 51.325.333; 1985) or in Japanese Patent Application-laid open Nos. 60-134931, 61-127075 and 61-127076 filed by some of the present inventors.

Referring back to FIG. 5, the explanation will be continued. Adjustment of the oscillation of the Van del Pol oscillator circuit is performed through an input terminal I. When an appropriate level of positive voltage is applied to the terminal I, the amplitude of oscillation is increased, while if a negative voltage is applied to the same, the amplitude of oscillation is decreased. In addition, it is possible to vary the basic frequency of the oscillator by controlling a gain controller through an input terminal F. However, in the embodiment shown in FIG. 4, the basic frequencies of all the oscillator circuits are fixed to a common value, that is to say, the basic frequencies of all the oscillator circuits coincide with one another. The output signals of the oscillator circuit of another processor element are supplied through the terminals A and B in the form of an oscillation wave, and the output oscillation wave is provided at the terminals P and Q. If there is no input, the outputs P and Q are 90° out of phase with each other. In accordance with the states of inputs applied to the terminals A and B, the phase difference between the outputs P and Q increases or decreases, and hence their frequencies and amplitudes change.

Incidentally, although it is well known that the aforesaid nonlinear oscillator circuits OSC are constituted by Van del Pol oscillator circuits which are assembled as shown in FIG. 5, various other circuit arrangements are known and utilized in various fields. Such a nonlinear oscillator circuit OSC may also be realized by employing an optical device or a chemical device utilizing the potential oscillation of a film instead of an electrical circuit device.

Each of the constituent elements of the preprocessing section shown in FIG. 4 will be described below in detail one by one. A processor element will be hereinafter abbreviated and referred to simply as "PE".

Vector Conversion Section

Figure 7:
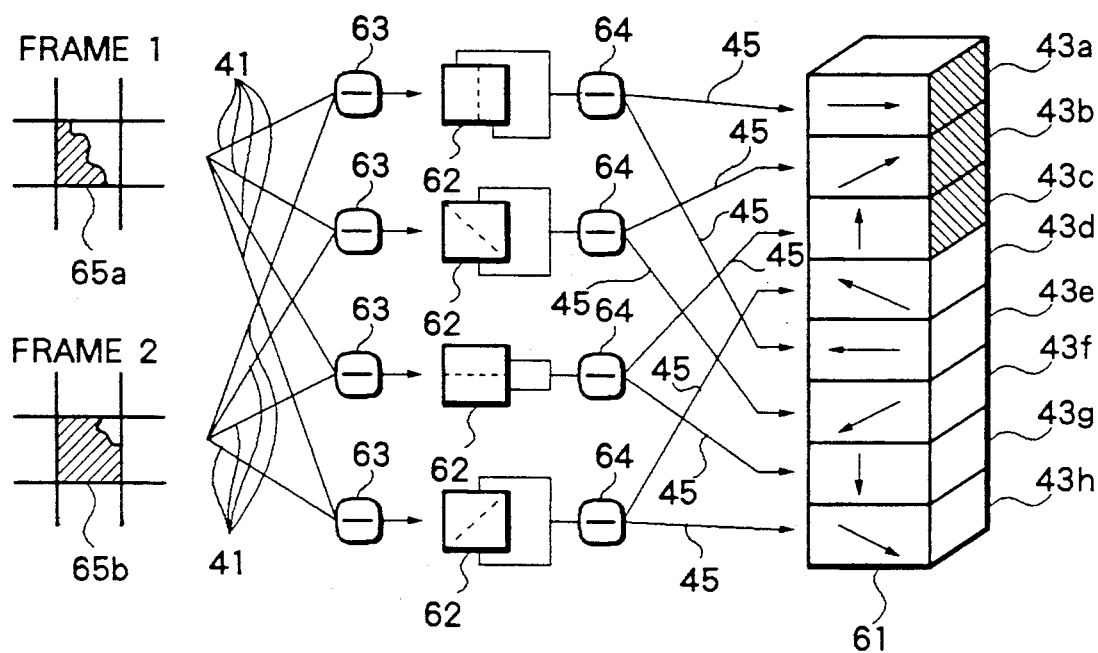
FIG. 7 is a schematic view showing the construction of the vector conversion block used in the embodiment.
Figures 8, 9, 10:
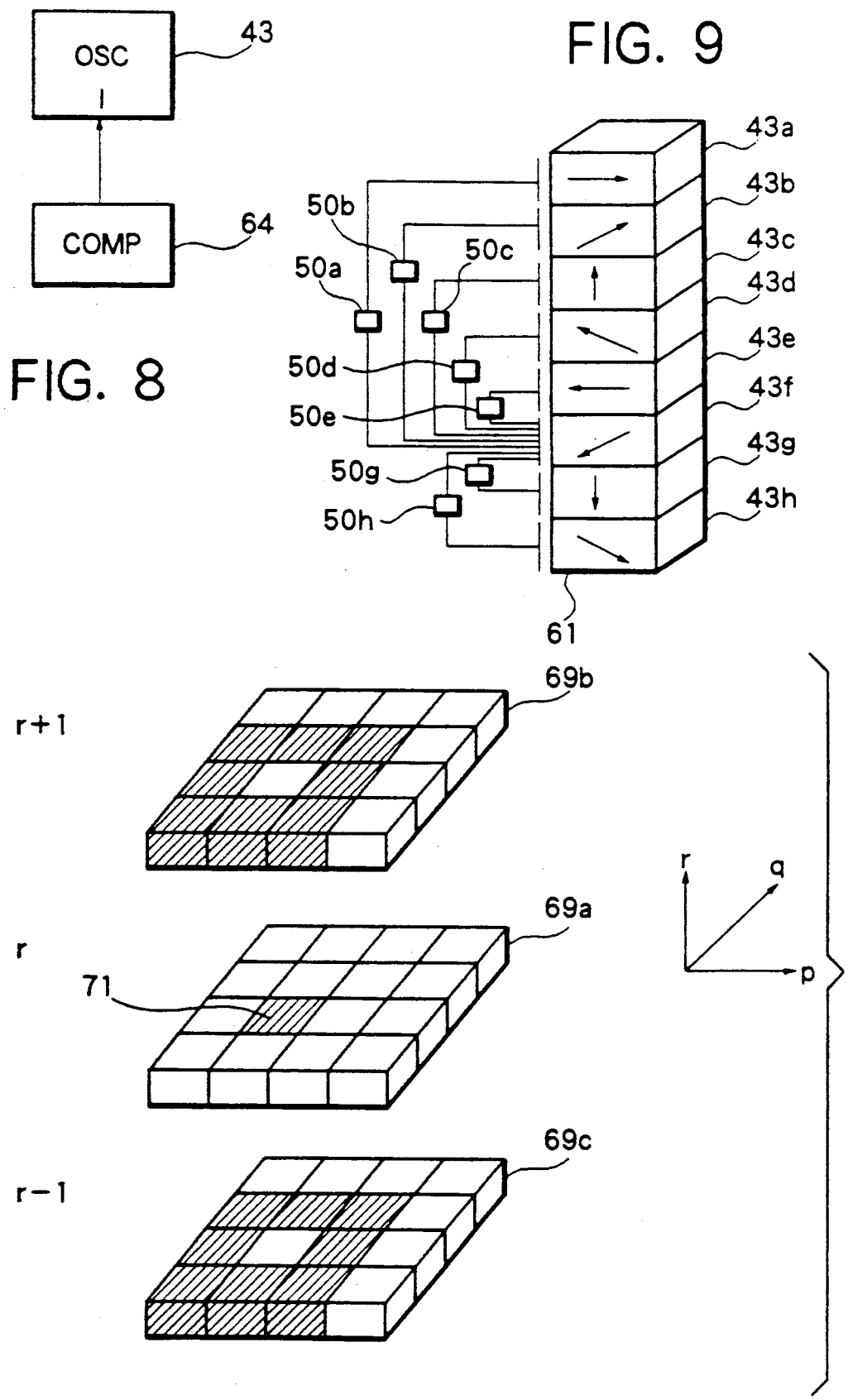
FIG. 8 is a schematic view which serves to illustrate the coupling between the vector conversion block and VP 105 in the embodiment.
FIG. 9 is a schematic view which serves to illustrate inter-hypercolumn mutual interference in the embodiment.
FIGS. 10 to 14 are schematic views which serve to illustrate adjacent mutual interference in the embodiment.

As described above, the video signal or luminance signal 41 for each frame is supplied from the input section (FIG. 3). The vector conversion block 104, as shown in FIG. 7, divides the luminance signal of the input motion image into mesh like picture elements. That is, one frame is divided into a plurality of picture elements. Incidentally, in the example shown in FIG. 7, reference numerals 65a and 65b each denote a single picture element, and shaded portions shown by hatching are depicted as a state change of 65a to 65b, which change illustrates the manner in which a motion changes upwardly toward the right. As illustrated, the video signals 41 which are respectively derived, as image signal data, from two picture elements each of which belong to either of two consecutive frames are supplied to four kinds of coding devices 62, where variations in shading of all the image signal data 41 are generally disintegrated into vectors in eight directions. This integration into vectors is performed in the following manner. First, the difference in density between the two picture elements 65a and 65b is calculated in each of four subtracters 63 and, furthermore, the outputs of the respective subtracters 63 are supplied to the corresponding coding devices 62. Each of the coding devices 62 compares the luminance difference at the opposite portions of the corresponding picture element which are divided by the dashed line illustrated in each box shown as 62 in FIG. 7, thereby effecting detection of density variations of four kinds, that is, variations in density in the right and left direction, the up and down direction, the plus-45° oblique direction, and the minus-45° oblique direction. Four comparators 64 receive the outputs from the respective coding devices 62 and determine that the object of recognition has moved in the direction in which the variation in density in each of the picture elements increases. Thus, each of the four comparators 64 supplies a signal 45 to each of the 8 PE's (43a to 43h). The signal 45 ("1" or "0") is input to the I terminal of each PE of VP 105. A signal 45 which exhibits "1" will weakly excite a PE of VP 105 to which the signal is input. A signal 45 of "0" will not excite a PE of VP 105. As shown in FIG. 7, a set of the 8 PE's of VP 105 represent the luminance variation of the horizontal upward direction, the oblique right and upward direction, the up direction, the oblique left and upward direction, the horizontal leftward direction, the oblique left and downward direction, the down direction, and the oblique right and downward direction. In the example of FIG. 7, as the input motion image proceeds from a frame 1 to a frame 2, the dense portion of the illustrated picture element extends in each of the horizontal rightward direction, the oblique right and upward direction, and the up direction. Accordingly, PE's (43a, 43b and 43c) are weakly excited and other PE's (43d to 43h) are not excited. The signal 45 which is output from the vector conversion block 104 is input to the information generating block 105. As schematically shown in FIG. 8, the output of the comparator 64 of the vector conversion block 104 is connected to the terminal I of the oscillator circuit OSC of the information generating block VP 105.

Information Generation Block

The portion VP which serves as the information generating block VP 105 will be described below. The eight outputs 45 for each picture element from the vector conversion block 104 are input to VP 105. As shown in FIG. 4, since VP 105 has a cubic structure which is characterized by "hypercolumns" 61 each of which consists of a set of eight processor elements which are vertically aligned in correspondence with the picture element 65$i$ (i=a, b, ... ) shown in FIG. 7 and a horizontal plane 69 each of which is called a "hyperplane", the entire VP 105 receives thirty two (=32=4×4×8) signals 45 from the block 104. The overall plane of each "hyperplane" corresponds to the overall picture for one frame. The aforesaid "hypercolumn" is named after a group of neurons which (is presumed by the present inventors to) have a function similar to the "MT area" ("primary visual area") of the brain cortex of living things. The processor elements 43 which constitute VP 105 are each constituted by the Van del Pol oscillator circuit OSC. Each processor element 43 which constitutes the uppermost "hyperplane" represents, as the phase of oscillation, the horizontal rightward variation in density in a picture element and represents, if it has been excited, partial feature that the corresponding picture element moves horizontally rightward, in accordance with the amplitude of the oscillation. Similarly, each processor element 43 which constitutes the second "hyperplane" represents, as the phase of oscillation, the oblique right and upward variation in density in the picture element, ... and, each processor element 43 which constitutes the lowermost "hyperplane" represents, as the phase of oscillation, the oblique right and downward variation in density in the picture element.

Incidentally, in FIG. 4, for the sake of simplicity of explanation, the number of illustrated hypercolumns are reduced to a considerable extent compared to the number of hypercolumns used in practice. The number of PE's of VP 105 depends upon resolution which is required for the object to be recognized.

As described above, the output 45 of the vector conversion block 104 for one picture element oscillates the "hypercolumn" 61 which is constituted by the eight vertically aligned processor elements 43 which correspond to the position of the picture element (FIG. 9). That is to say, the outputs of the comparator 64 of FIG. 7 are connected to the terminals I (FIG. 5) of the respective processor elements 43, and each of the processor elements 43 assumes a "pause" state or a weakly excited state in accordance with whether the signal input to the corresponding terminal I is "0" or "1". The whole of the oscillation patterns of the respective processor elements 43 thus obtained constitute a "rough image" of the input frame.

As shown in FIG. 7 by way of example, in most cases, vectors in a plurality of directions are detected with respect to a single picture element. This means that since the vectors detected by the vector conversion block 104 merely represent shading variations in isolated picture elements, the vector "image" obtained when the vectors are input from the vector conversion block 104 to VP 105 is merely an ambiguous representation of a motion image in which the direction of motion of each picture element is not specified.

The application of the aforesaid "local rules" and the function of the "holonic loop" shown in FIG. 2 are utilized to attach "meaning" to such an "ambiguous image", thereby forming a distinct "image".

First, the "local rules" will be explained.

The processor elements 43 oscillated by the vector input 45 form, in VP 105, an "image" which represents a certain motion pattern as a whole with the directions of the vectors amended to some extent by virtue of two kinds of interference among the oscillator circuits. One kind is called (A) inter-hypercolumn mutual interference and the other kind is called (B) adjacent mutual interference. The rules which govern the above two kinds of mutual interference are the "local rules" mentioned above, and the reference supplying block 101 plays the role of giving the phase reference for the "local rules".

FIG. 9 is a connection diagram which serves to illustrate the inter-hypercolumn mutual interference created by the connections between the processor elements 43a to 43h in one of the "hypercolumns". Incidentally, in the figure, the connections between one processor element 43f and the other processor elements in the hypercolumn 61 are shown for the purpose of illustration only, and the remaining processor elements are also connected to one another in a similar manner. The connection example of FIG. 9 is realized by connecting the outputs P and Q (FIG. 5) of the oscillator circuit of the processor element 43f to the respective inputs A and B of the oscillator circuits of the other processor elements through seven corresponding amplifiers 50a to 50e, 50g and 50h. The intensity of inter-hypercolumn mutual interference is changed in accordance with the phase difference between the oscillations of the processor elements and the gain of each amplifier 50a to 50e, 50g and 50h, and the gains of these amplifiers are fixed so that processor elements which represent motion in the opposite directions may interfere with each other, that is to say, the processor element 43f which represents motion in the oblique left and downward direction in the example of FIG. 9 may most intensively interfere with the processor element 43b which represents motion in the oblique right and upward direction. The intensity of the mutual interference between the processor element 42f and the processor element 43e or 43g is set to the smallest value. The interference realized by the above connection serves to reciprocally weaken the oscillation of mating ones and causes processor elements which represent motion in the opposite directions to compete with each other, thereby enabling a processor element which exhibits the strongest oscillation to inhibit or suppress the oscillations of the other processor elements. Gains set for the amplifiers 50a to 50h (FIG. 9) represent coefficients of inter-hypercolumn interference. Let us suppose that the coefficients of seven interactions which input to a certain PE of VP 105 are plotted in the direction of a vertical axis with the direction of column as a horizontal axis. If every plotted point is on a smooth curve such as sine curve, the "image" hold within the VP cube comes to be sharp. For example, the square curve of sine wave are selected as the smooth curve above for the present model. It is thus possible to provide the effect of making sharp the vector of each picture element. However, this sharpness is not sharpness in a spatial sense.

Figure 11:
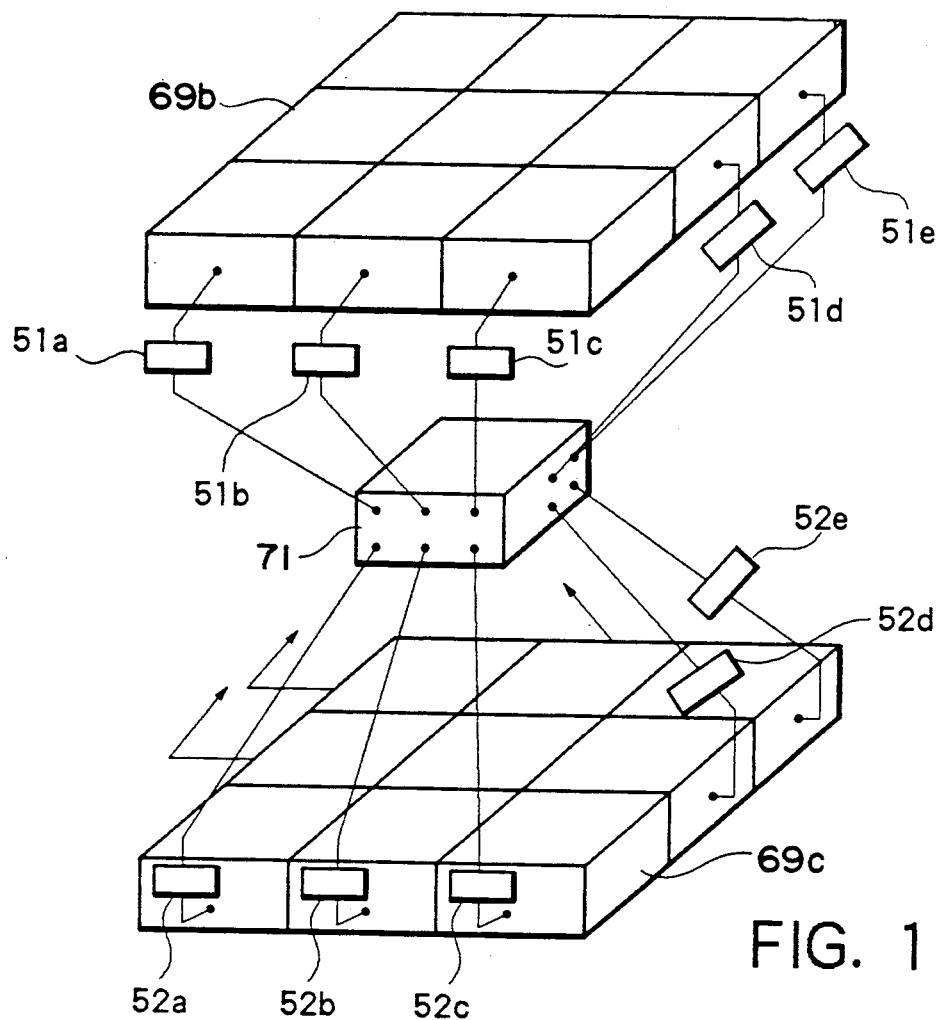

FIGS. 10 and 11 are diagrammatic views which serve to illustrate a connection for creating the adjacent mutual interference noted as (B). These figures show that a processor element 71 in an r-numbered hyperplane 69a is connected to 8×2 (16 in total) processor elements shaded by hatching in two adjacent hyperplanes 69b and 69c. Each set of eight processor elements belongs to eight adjacent hypercolumns with respect to the hypercolumn which includes the processor element 71. Incidentally, the processor elements other than the processor element 71 in the r-numbered plane are also connected in a similar manner. The outputs P and Q of the oscillator circuit of the processor element 71 in the r-numbered plane are connected through amplifiers 51a, 51b, . . . , 51d, 51e, . . . to the respective inputs A and B of the oscillator circuit of each of the "eight adjacent" processor elements which constitutes either of the two sets.

It is to be noted that the processor element 71 shown in FIG. 10 or 11 belongs to one "hypercolumn" and the "r-numbered hyperplane". Accordingly, the inter-hypercolumn mutual interference and the adjacent mutual interference act upon this processor element 71 in a synthesized manner.

Figure 12:
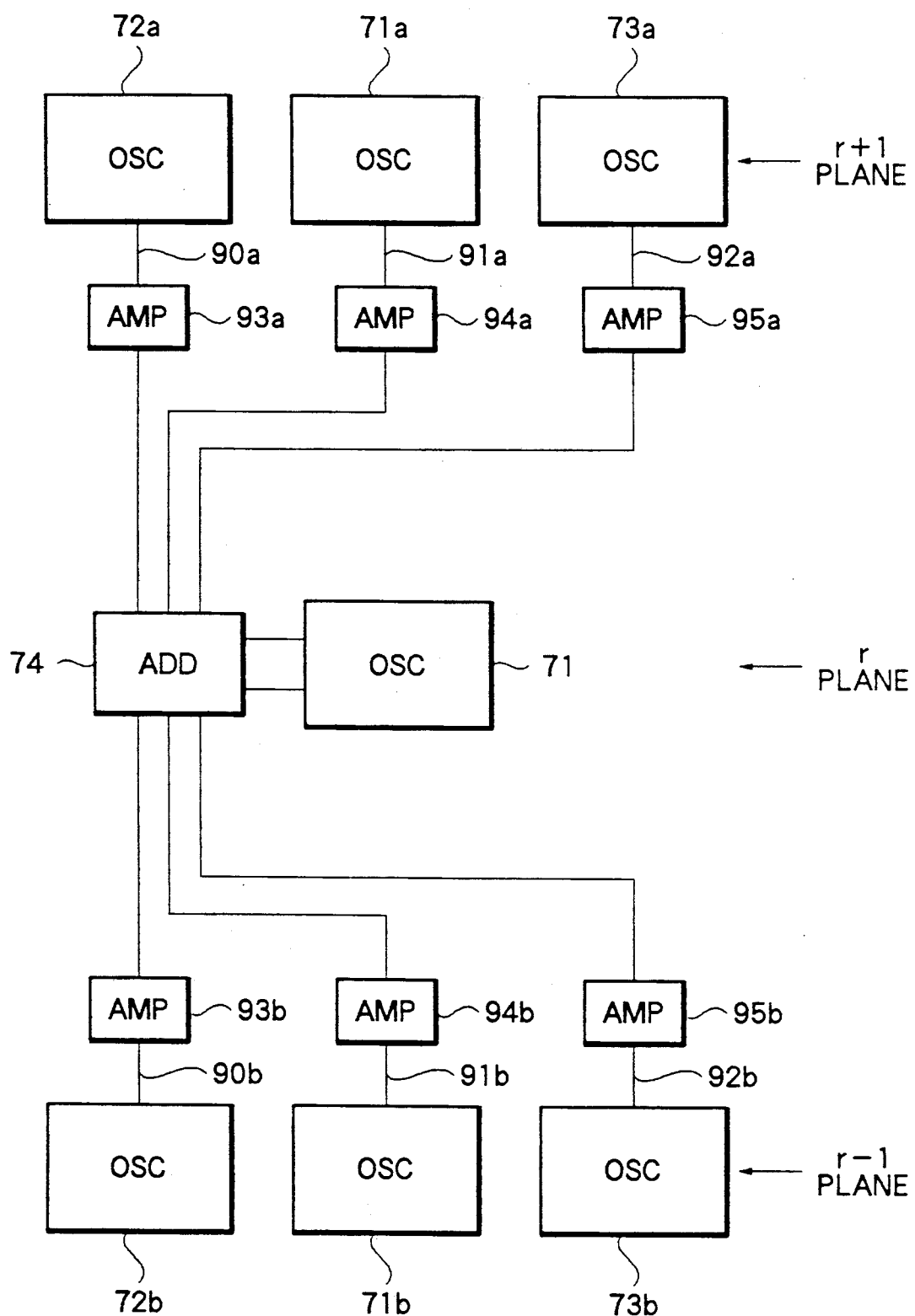

FIG. 12 shows the processor element 71 and six of the eight processor elements adjacent to the processor element 71. The processor element 71 as well as processor elements 71a and 71b belong to the same "hypercolumn", as shown in FIG. 12. The processor 71a as well as processor elements 72a and 73a belong to an r+1-numbered "hyperplane", while the processor element 71b as well as processor elements 72b and 73b belong to an r+1-numbered "hyperplane". The "inter-hypercolumn" mutual interference acts upon the processor element 71 through signal lines 91a, 91b and amplifiers 94a, 94b. Similarly, the "adjacent mutual interference" acts upon the processor element 71 through signal lines 90a, 92a, 90b and 92b and amplifiers 93a, 95a, 93b and 95b. These interferences are input through adder 74 to the processor element 71. The intensity of the mutual interference for each pair of PE's can be controlled by changing the gains of these amplifiers. The amplitude of the output oscillation of the PE 71 changes in accordance with the input from the adder 74.

As will be described later, the adjacent mutual interference is amended in accordance with the kind of motion which corresponds to the "image" recognized by the memory section 6 and formed in VP 105. This amendment is effected by altering the gain setting of each of the amplifiers 93a, 95a, 93b and 95b in the connection shown in FIG. 12, which determine the adjacent mutual interference. More specifically, the rule altering block 103 alters the gain settings in accordance with the output of the memory block 106. The gain settings will be explained later in connection with FIGS. 13 and 14.

As shown in FIG. 4, the above adjacent mutual interference acts as feedback loop, and it is therefore possible to generate in VP 105 a peculiar "vector image" with respect to a motion pattern to be recalled in the memory block 106. In addition, since the mutual interference between adjacent hyperplanes is utilized, it is possible to achieve the effect that spatial variations in the direction of motion which are represented by the vector "image" of each picture element can be made to be smooth continuous variations.

In this manner, in accordance with applied "local rules" called the "inter-hypercolumn" mutual interference and the adjacent mutual interference, a primitive "ambiguous image" which is input from the vector conversion block 104 directly to VP 105 is amended to provide an image which ensures that "memory" corresponding to the "ambiguous image" is called up.

Hardware of Mutual Interference

Figure 15:
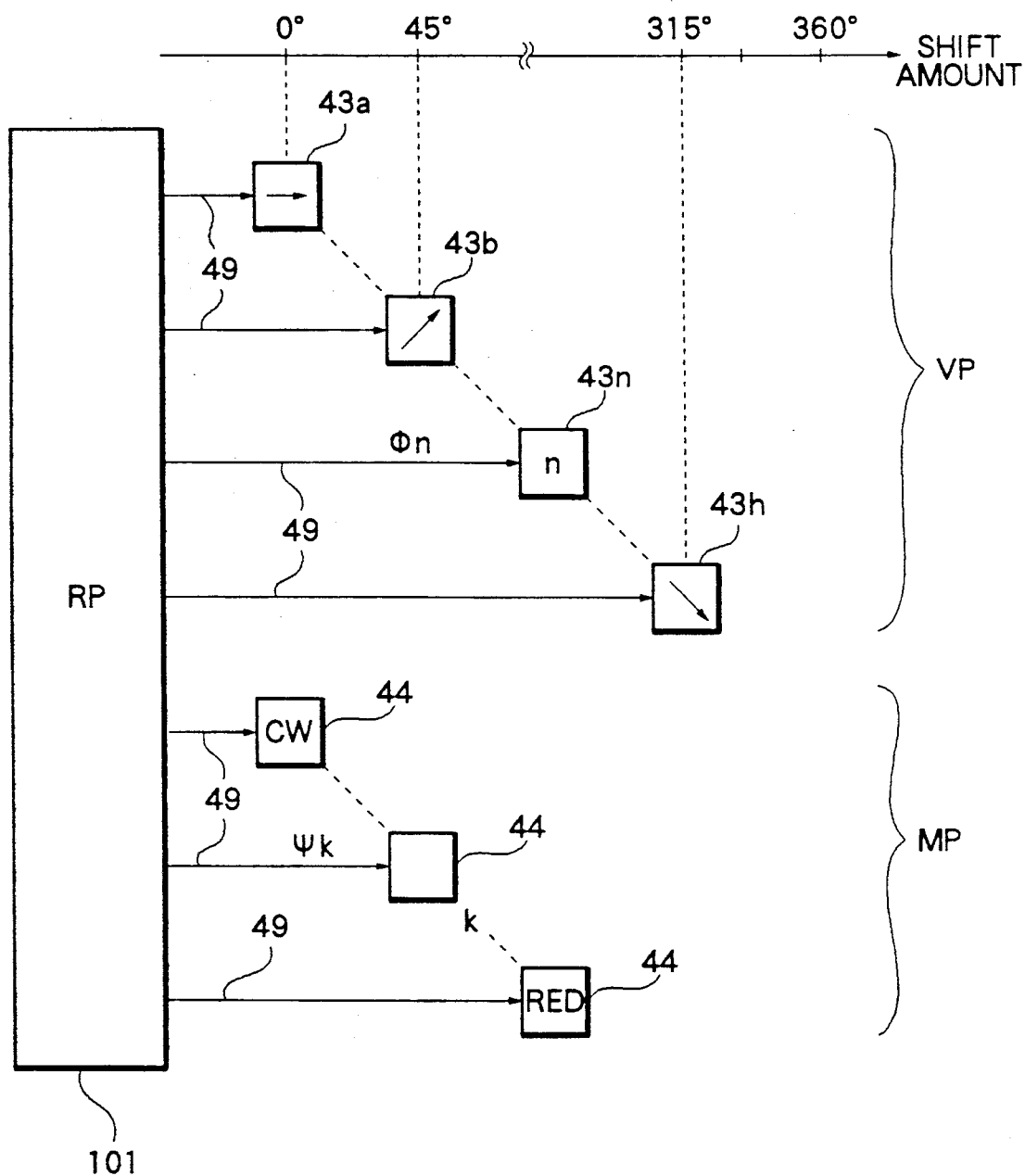
FIG. 15 is a diagram showing the phase of the output signal of a reference supplying block (reference processor RP)

The reference supplying block 101 which provide the reference of the oscillation of each processor element within VP 105 and MP 106 is constituted by a processor element including a single oscillator circuit and several phase shift circuits. The oscillator circuit of the reference supplying block 101 has grounded input terminals A and B, an input terminal I which is fixed to an appropriate potential, and a circuit constant which is selected so that the oscillator circuit can continue stable oscillation even if no input is supplied from any other circuits. As shown in FIG. 15, the reference of oscillation which the reference supplying block 101 supplies to other processor elements through their corresponding phase shift circuits SHFT is represented by the amount of phase shift of from 0° to 360°.

Figure 17:
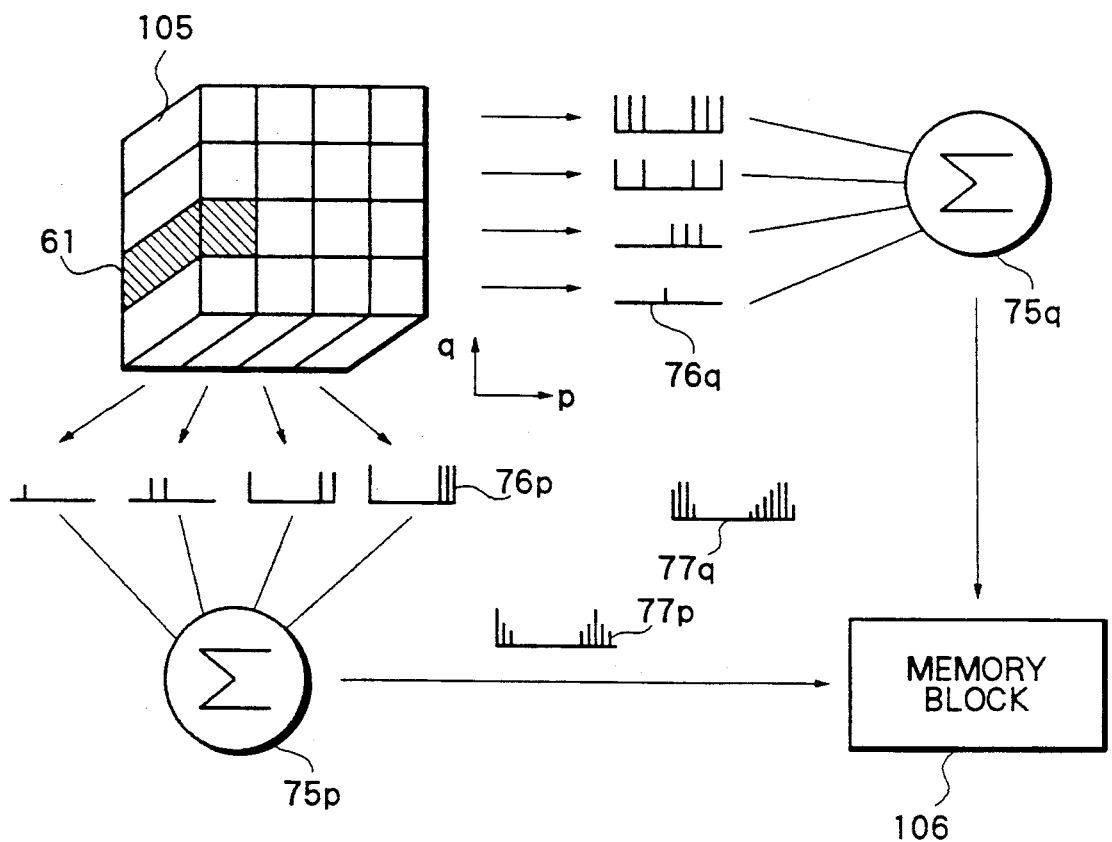
FIGS. 17 and 18 are block diagrams showing an information processing circuit which constitutes a holonic loop.

The amount of phase shift, denoted by 49, is given to each of the eight processor elements 43a to 43h (FIG. 9) of each "hypercolumn" of VP 105 through the corresponding phase shift circuit SHFT in order for the eight processor elements 43a to 43h to have oscillation of phase difference $\Phi_n$ as schematically shown in FIG. 15 (Refer to FIG. 17). In FIG. 15, if it is assumed that the direction of axis P in a (p, q) plane (that is, the horizontal rightward direction on the sheet of FIG. 15) corresponds to a vector in the direction of motion of 0 degree, a processor element 43 which belongs to a hyperplane which is located at the nth position in the descending order has a phase which is determined as follows $$\Phi_n = (n-1) \times 45 \text{ degrees}$$

More concretely, in FIG. 15, the amount of phase shift, denoted by $\Phi_8$ which is given to the processor element 43h by the reference supplying block 101 is 315 degrees since the processor element 43h is located at the lowermost position in the arrangement shown in FIG. 7. In other words, the amount of phase shift $\Phi_n$ given by the reference supplying block 101 determines a position in each "hypercolumn". When the amount of phase shift of each processor element in the "hypercolumn" is determined with respect to the reference supplying block 101 as shown in FIG. 15, then the direction of motion represented by each PE in the hypercolumn is determined as shown in FIG. 9. In addition, since the respective processor elements in the "hypercolumn" are connected as shown in FIG. 9, the "inter-hypercolumn" mutual interference is realized.

The amount of phase shift of the oscillation of each processor element 43 in VP 105 is set as shown in FIG. 15. The amplitude of oscillation of each processor element 43 is adjusted so that oscillation becomes very small when the above-described vector input image from the vector conversion section 104 (which is input as a positive voltage to the I terminal of the oscillator of each processor element of VP 105 as described in connection with FIG. 8) is not received or when the relevant processor element 43 does not undergo any exciting mutual interference of other processor elements in VP 105. As described previously, the term "other processor elements" includes processor elements responsible for the "inter-hypercolumn" mutual interference and the adjacent mutual interference and the rule altering block 103 including the processor 42 which will be described later. Incidentally, the state wherein oscillation is very small is called the "state of pause".

Once VP 105 receives an output from the vector conversion block 104 and several processor elements start to oscillate, an "ambiguous image" is formed in VP 105 at this time as described previously. Then, each processor element 43 in VP 105 sharpens the "image" in each "hypercolumn" and smoothens the "image" across the "hyperplanes" by virtue of the above-described two kinds of mutual interference, whereby the "ambiguous image" is amended to provide an image which ensures that "memory" corresponding to the "image" is extracted from the memory block 106.

Establishment of "image"

Establishment of an "image" is effected through the steps of "recalling" a concept stored in the memory section 106 on the basis of the "image" which is formed in VP 105 by virtue of the two kinds of mutual interference and altering the rules of the aforesaid adjacent mutual interference on the basis of the step of "recalling". The "recalling" step and the rule altering step will be explained in connection with FIGS. 17 and 18, respectively. The term "recalling" used in the presently preferred embodiment is defined as a process of extracting four kinds of concepts of motion which are respectively called "clockwise rotation", "anti-clockwise rotation", "expansion", and "reduction" from the pattern of motion which is generated, for example, as an vector "image" in VP 105. The "recalling" step is based on findings according to which the brains of living things function to recognize the concepts of motion called "rotation", "rotation in opposite direction", "expansion", and "reduction". Incidentally, it is said that the brains of living things serve to recognize linear motion in addition to the aforesaid four kinds of motion.

FIG. 17 is a view which serves to illustrate the operation of the transfer block 102 for transferring to the memory block 106 a motion pattern which is generated as a vector "image" in VP 105. It is to be noted that, in this case, the processor elements of VP 105 which are each constituted by a Van del Pol oscillator serves as analog processors.

In FIG. 17, the output of the processor element 43 whose amplitude of oscillation has reached a threshold is obtained by using a comparator (not shown) for comparing the amplitude with the threshold, and the amplitude is output from the terminals P and Q as the output pulse which is generated in zero phase by the oscillator circuit. As shown in FIG. 17, the thus-obtained oscillation pulses of the respective processor elements are simply added for each hypercolumn 61. More specifically, outputs having amplitude not less than a predetermined value are selected from among the outputs of the respective processor elements 43 of VP 105 of FIG. 4, and the selected outputs are added in the direction of r in the same figure.

In addition, the logical sum of the outputs of hypercolumns in which the coordinates of the position of p or q in a (p, q) plane are the same is obtained, that is, the logical sum in each of the direction q and p is obtained. Each of the logical sums thus obtained is weighted in proportion to the individual coordinates of the positions to provide a set of four output signals 76p and another set of four output signals 76q. In addition, the four output signals 76p are added by an adder 75p to provide a pulse signal 77p, while the other four output signals 76q are added by an adder 75q to provide a pulse signal 77q. These pulse signals 77p and 77q are fed to the memory section 106. It is to be noted that the form of the envelope of each pulse signal 77p and 77q is approximately sinusoidal.

The memory block 106 of the memory section 6 is, as shown in FIG. 4, constituted by the four processor elements 44, each of which represents a single conceptualized motion pattern. The conceptualized memories of four kinds in the memory block 106 correspond to the pattern selectivity of the "MST area" of the brain cortex in which are centered cells of the kinds which exhibit peculiar reactions to the pattern of motion. Each processor element 44 is constituted by the Van del Pol oscillator circuit of FIG. 5. The pulse signal output from the transfer block 102 is input to the Van del Pol oscillator circuit of the process element 44. In the present embodiment, the conceptualized memories of four kinds which are called rotation (clockwise: CW), expansion (EXP), rotation (anti-clockwise: ACW), and reduction (RED) are set in the four processor elements 44 of the memory block 106, respectively.

As described above, if a predetermined input is supplied from one to the other of two connected Van del Pol oscillators, then the phenomenon of "entrainment" occurs. More specifically, when the pulse signals 77p and 77q are input from the transfer block 102 to each of the processor elements 44, then the phenomenon of "entrainment" occurs in a processor element which exhibits the best matching to the "image" generated in VP 105.

Figure 19:
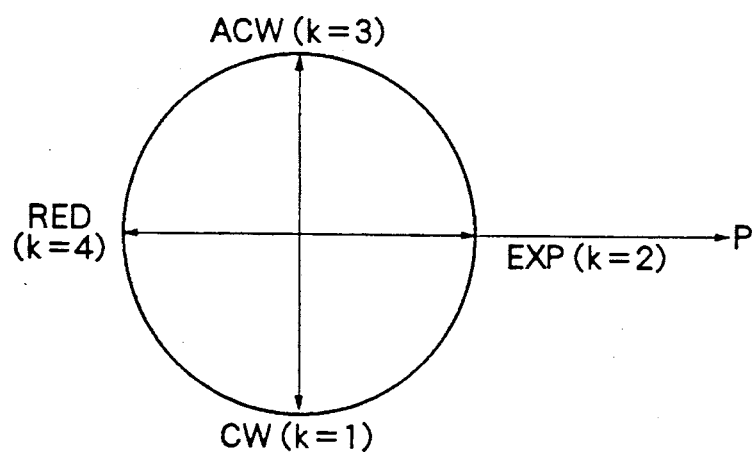
FIG. 19 is a view showing in graphic representation the phase difference between the output signals of the reference processor RP.

The following is a description of a method for setting the conceptualized memories of the four kinds in the respective processor elements 44 of the memory block 106. First, the reference supplying block 101 gives a predetermined amount of phase shift 49 shown in FIG. 16 to each of the four processor elements 44. The present inventors has discovered that, where it is assumed that an ideal vector input image corresponding to a certain pattern of motion is given to VP 105, if the envelope waveform of the output pulses 77q and 77p from the transfer block 102 is compared with the waveform of the output signals provided at the P and Q terminals of the reference supplying block 101, then the phase difference between the envelope waveform and the waveform of the output signal is individually determined for each pattern of motion. As shown in FIG. 15, the reference supplying block RP 101 gives each processor element 44 of the memory block MP 106 the amount of phase shift $\Psi_k$ peculiar to the relevant motion pattern. The value of the amount of phase shift $\Psi_k$ is given by $$\Psi_k = (k-1) \times 90 \text{ degrees}$$

where k=1, 2, 3 and 4 in the order of the conceptualized memories CW, WXP, ACW and RED. This amount of phase shift is illustrated in FIG. 19. Incidentally, the phase of the output signal of the reference supplying block 101 is made coincident with axis P so as to prepare a reference signal. In FIG. 19, it is to be noted that ACW and CW are 180 degrees out of phase with each other with RED and EXP 180 degrees out of phase with each other.

The circuit constant of each processor element 44, which has been described in connection with FIG. 5, is adjusted so that, similar to the processor element 43, the processor element 44 may assume the state of pause in the absence of any input. The input terminal I of the oscillator circuit of each processor element 44 is fixed to an appropriate potential.

Figure 20:
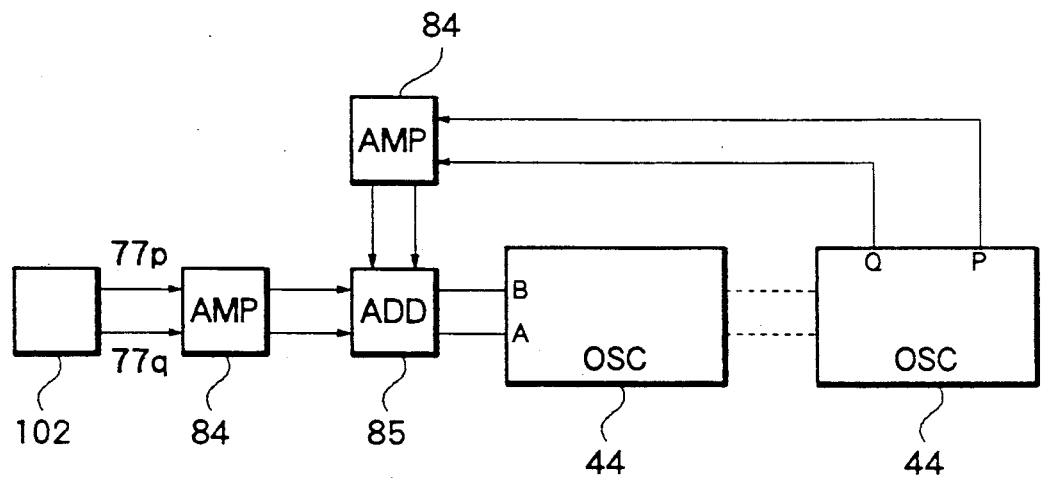
FIG. 20 is a block diagram which serves to illustrate the coupling between adjacent processor elements in the memory block of the embodiment apparatus.

As shown in FIG. 20, the outputs 77q and 77p supplied from the transfer block 102 are connected to the respective input terminals A and B of each processor element 44 through an amplifier 84 and an adder 85. This connection enables the processor element 44 which is closest in phase to the envelopes of the outputs 77p and 77q to oscillate strongly by virtue of "entrainment". This process is the aforementioned "recalling of memory".

Improvement of Separation of Conceptualized Memories

Figure 18:
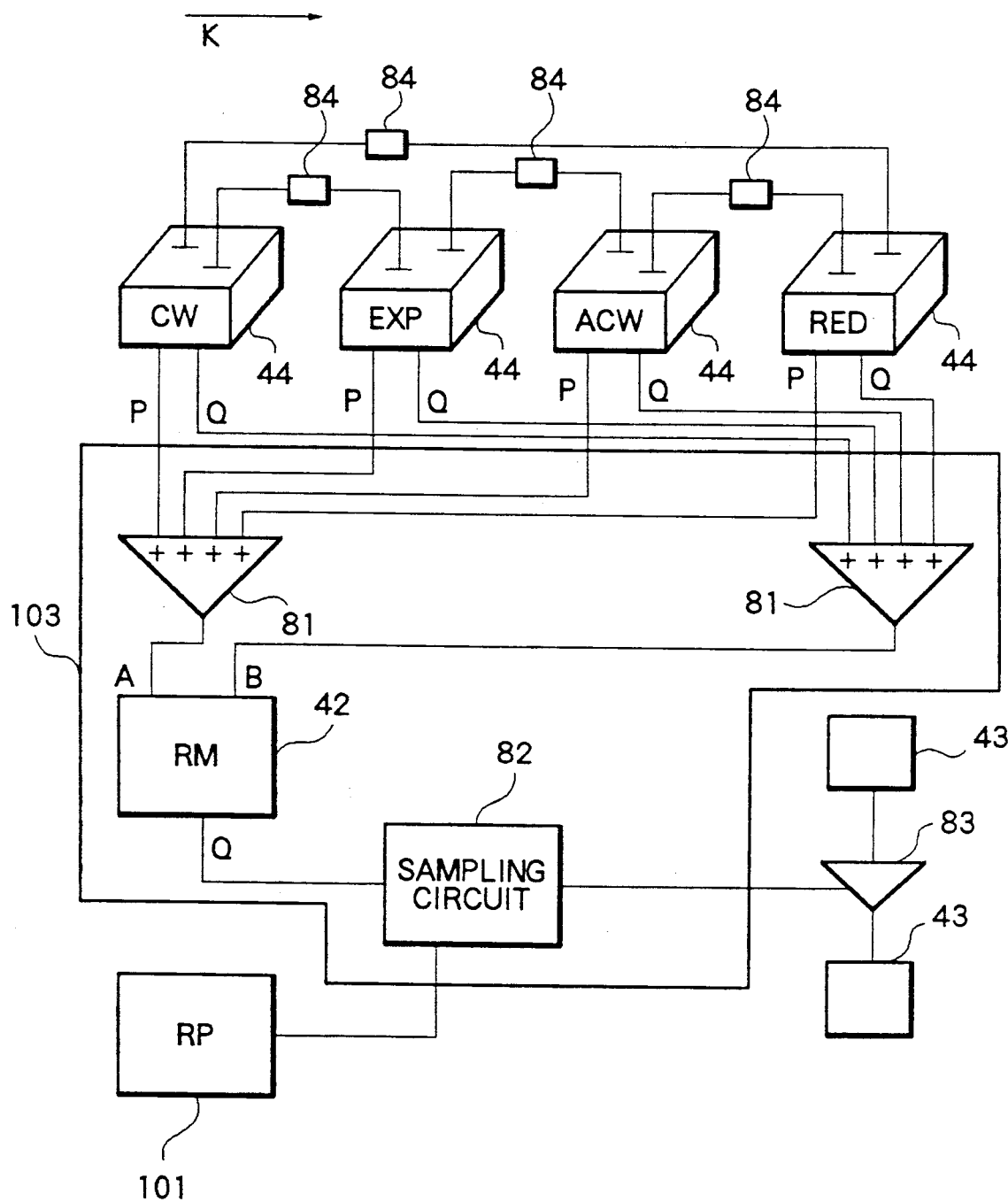

It is possible to recall memory which well matches to the "image" formed in VP 105 by utilizing the above-described "recalling of memory". In addition, if, as shown in FIG. 18, the adjacent processor elements 44 are connected to each other so as to weaken their oscillations reciprocally, it is then possible to improve separation of conceptualized memories to be recalled by utilizing the competition between the processor elements. The improvement of the separation of the conceptualized memories reduces the possibility that two or more conceptualized memories may be mistakenly selected.

The connections between the processor elements 44 for improving such separation are arranged as follows. As shown in FIG. 18, the gain of each amplifier 84 is set so that reciprocal weakening of oscillation may occur between EXP and CW, ACW and RED, EXP and ACW, and RED and CW. In addition, the outputs provided at the terminals P and Q of one of the mutually connected processor elements are appropriately amplified by the amplifier 84 (FIG. 20) and, after the amplified outputs P and Q are respectively added to the pulses 77q and 77p, the added signals are input to the terminals A and B of the other of the mutually connected processor elements.

Holonic Loop

FIG. 18 shows the construction of the rule altering block 103 for altering the rule of the above-described adjacent mutual interference in VP 105 by feeding back the result of the processing executed by the memory section 6 to the information generating section 5. The present inventors discovered that the distribution of the intensity G of adjacent mutual interference is individually determined for each pattern of motion which is set so as to be recognizable by the present system, in accordance with (1) the relative positions, in the (p, q) plane, of the processor elements 43 which interfere with each other, and (2) the relative positions in the r direction of hyperplanes which respectively include the processor elements 43. The effect of the alteration of the rule can be achieved on the basis of the above finding. Incidentally, the intensity G is set in the amplifier shown in FIG. 12, as gain thereof.

Figure 14:
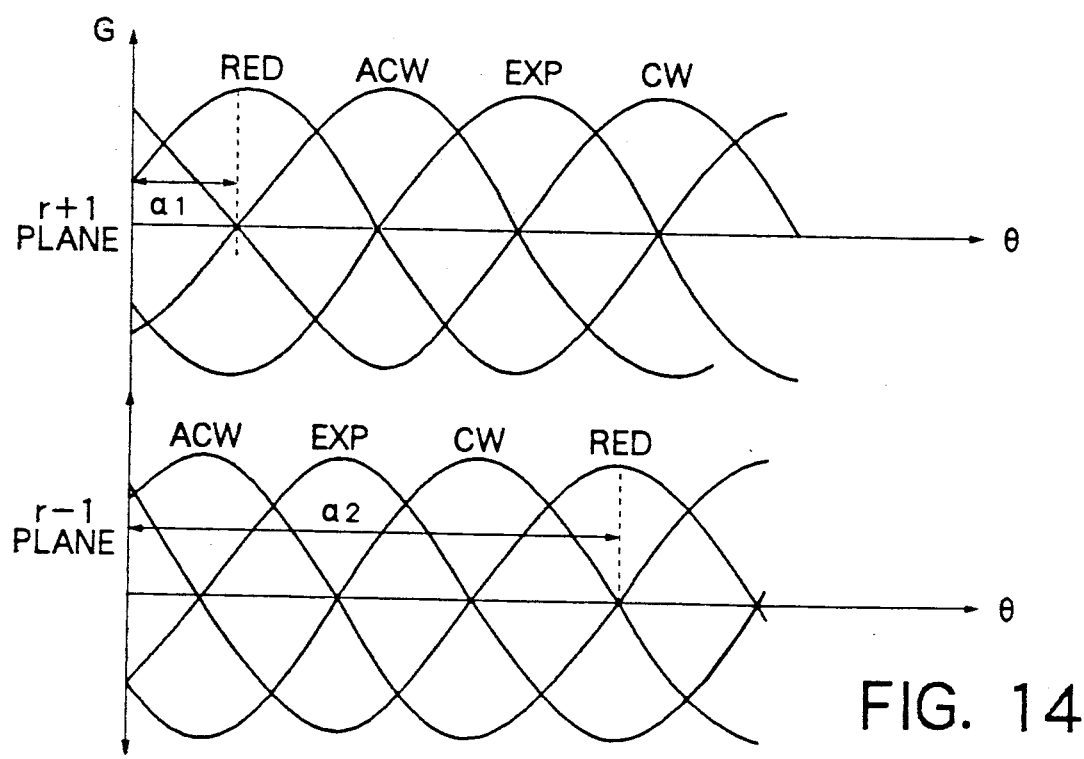
Figure 13:
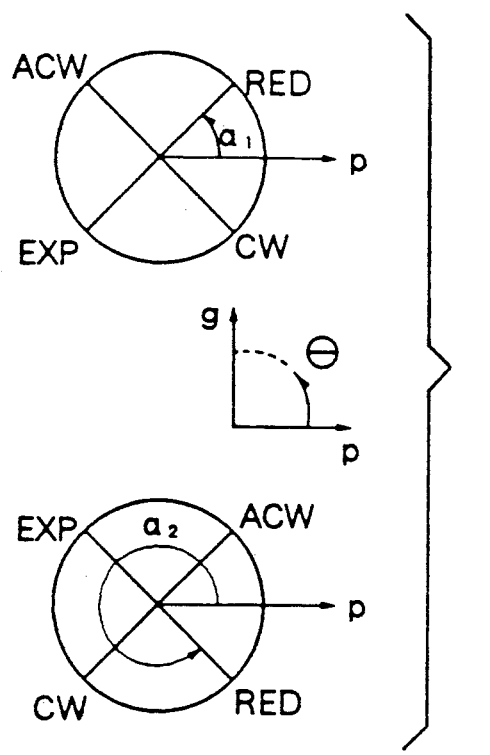

An example of the distribution of the intensity G of adjacent mutual interference is shown in FIGS. 13 and 14. FIG. 13 shows the relative positions where mutual interference coefficients G between a pair of PE's exhibit the maximum intensity, that is, it shows (p,q) plane.

Referring to FIG. 13, if a memorized motion corresponding to reduction RED is recalled in the memory block 106, the distribution of the intensity G created in VP 105 is such that, PE's located at the spatial position of $\theta = \alpha 1$ between the r-numbered and r+1-numbered hyperplanes and PE's located at the positions of $\theta = \alpha 2$ between the r-numbered and r-1-numbered hyperplanes, make each other excited with the maximum intensity. FIG. 14 represents the distribution of the intensity G shown in FIG. 13 with $\theta$ and G plotted along the horizontal axis and the vertical axis, respectively.

In FIG. 13, the angle of such maximum intensity G with which the mutual interference acts from r-plane to r+1-plane increases in the order of RED→ACW→EXP→CW in the direction of the anticlockwise direction of $\theta$. It is to be noted that this order is reverse to the order in which the amount of phase shift $\Psi$ given to each of the four processor elements 44 of the memory block 106 increases, that is, the order of CW→EXP→ACW→RED. It should be further-noted that the positions of maximum intensity G for RED, ACW, EXP and CW are arranged in this order with shift by 90 degrees. More specifically, a graph obtained by reversing the graph of FIG. 14 with respect to the horizontal axis and giving it proper phase shifts will accord with a graph illustrating the four oscillation waves with time as a horizontal axis, which are outputs of MP 106. The phase difference of each of the oscillation waves with respect to the output of RP 101 is $\Psi_k$. Since the order of distribution of the intensity G of mutual interference is opposite to the order of the magnitude of the amount of phase shift $\Psi$ given to the four processor elements 44 of the memory block 106, the adjacent mutual interference resulting from the feedback loop achieves the effect of spatially smoothening the vector "image" generated in VP 105.

The distribution of the intensity G of the adjacent mutual interference is amended by the recalled memory, an "image" is re-formed in VP 105 by virtue of the adjacent mutual interference according to the amended interference intensity G, and the re-formed "image" is again input to the memory block 106. Subsequently, the holonic loop between the information generating section 5 and the memory section 6 can be used to "self-organize" an "motion image" which bears an appropriate relationship to the original input image signal data and the recalled memory.

The hardware construction of the holonic loop is as shown in FIG. 18 which serves to illustrate the relationship between the memory block 106, the rule altering block 103, and VP 105. The rule altering block 103 is constituted by adders 81, the feedback processor element 42, a sampling circuit 82, and so forth. The outputs provided at the P and Q terminals of the respective processor elements 44 are simply added in the corresponding adders 81, and the individual results are input to the corresponding terminals A and B of the feedback processor element 42. Incidentally, the circuit of the feedback processor element 42 is adjusted so that, in the absence of any input, the circuit may assume the state of pause, and the potential of its terminal I is set to a fixed level.

The sampling circuit 82 is arranged to sample, at the rate of 8 samples per cycle time, the oscillation waveform provided at an output terminal Q of the feedback processor element 42 on the basis of the oscillation phase supplied by the reference supplying block 101. Incidentally, the period of the oscillator of the feedback processor element 42 is made coincident to the oscillation period of the processor element 43 of VP 105. The reason why the output signal of the feedback processor element 42 is sampled at the rate of 8 samples per cycle time is that the adjacent mutual interference is set to interact, in this embodiment, between the eight PE's of VP 105 which are in "eight-neighbor" relationship to each other. On the basis of the output of the sampling circuit 82, the amplifier 83 is controlled which serves to adjust the intensity G of the adjacent mutual interference between the processor elements 43 of VP 105.

In this manner, the use of the above-described feedback loop, that is, the holonic loop enables the processing rules, that is, the adjacent mutual interference in VP 105 to be determined as the distribution of the intensity of the adjacent mutual interference required to form a vector "image" which has high correlation to a recalled conceptualized memory.

Result of Experiment on Motion Pattern Recognition

Figures 21A, 21B:
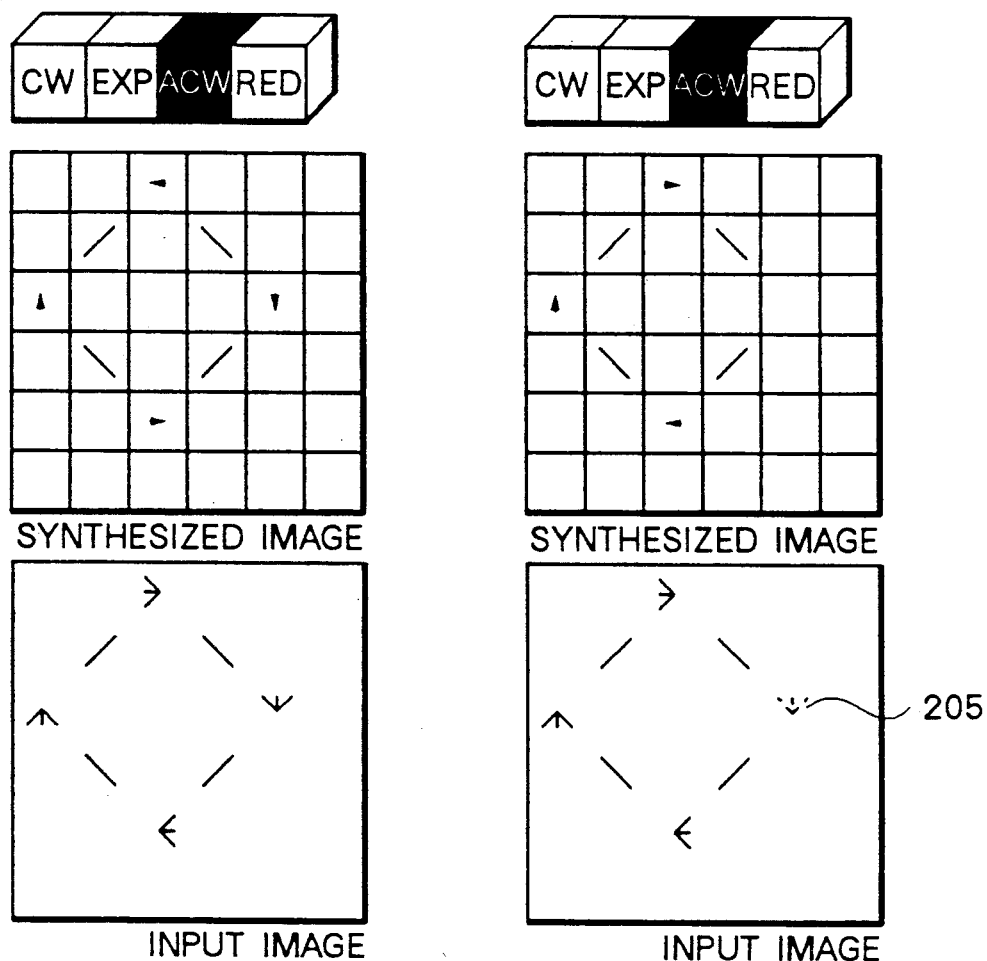
FIGS. 21A, 21B and 22 are diagrammatic views which serve to illustrate the result of experiments on recognition of a motion pattern in the preprocessing section of the present embodiment.
Figure 23:
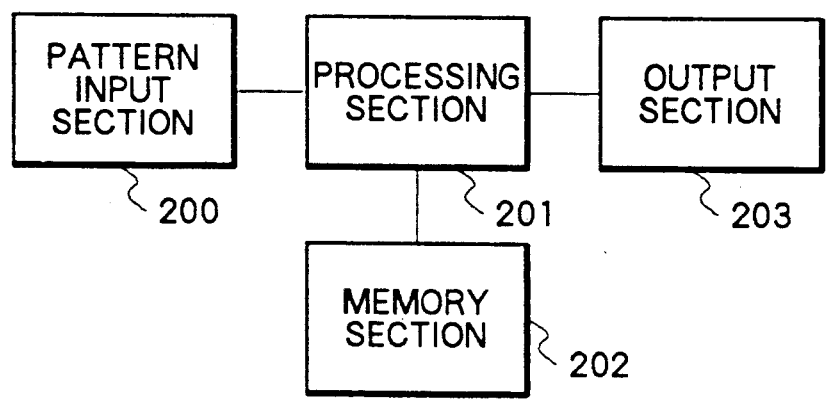
FIG. 23 is a block diagram which serves to illustrate the construction of a conventional pattern recognition apparatus.
Figure 22:
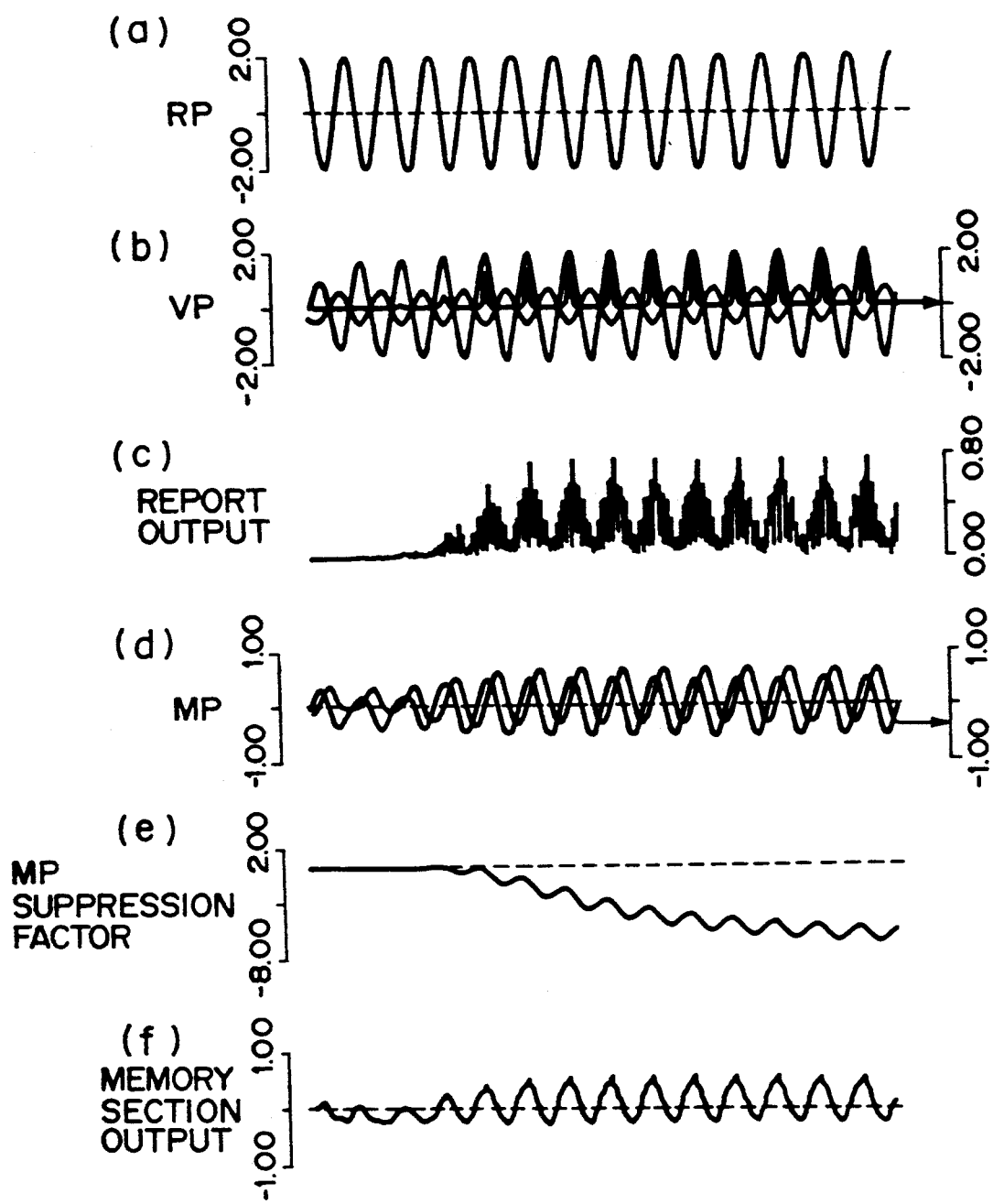

FIGS. 21A, 21B and 22 show the result of simulation of the motion pattern recognition process executed in the preprocessing section 2. FIG. 21A shows the result of simulation of a case where a normal pattern which makes anticlockwise rotation ACW is input, while FIG. 21B shows the result of simulation of a case where image signal data including a defect (a part denoted by 205) is input. FIG. 22 shows a variation in the signal of each block with time in the presence of the input shown in FIG. 21A.

In FIG. 22, part (c) shows the waveform obtained when the pulses generated by the respective processor elements of VP 105 are weighted in proportion to the position coordinates in the space of VP 105 and added together. It can be seen that the frequency of the envelope of the signal of part (c) is the same as that of the oscillator of the reference supplying block RP 101.

Part (d) of FIG. 21B shows the waveform of each processor element 44 of the memory block 106, while part (e) of FIG. 21B shows a variation in an suppression coefficient between the processor elements 44 with time. In the example of FIG. 21B, the motion ACW is recalled strongly compared to the conceptualized memories in the other processor elements 44 in response to the input of part (c) and the suppression coefficient of ACW is small.

Part (f) of FIG. 21B shows the result of addition of the waveforms of all the processor elements 44 (the outputs of the respective adders 81 shown in FIG. 18). As can be seen from part (f), each of the signals (c) and (f) representing information which constitutes the holonic loop forms a pattern of peculiar phase on the basis of the oscillation of the reference supplying block RP 101. The phase difference between the oscillation of the reference supplying block RP 101 and the signals (c) as well as (f) is a phase difference which represents the concept of anticlockwise rotation.

The above-described result of experiment makes it clear that the preprocessing section 2 of the present embodiment is capable of clearly recognizing not only the ideal motion pattern which is shown as an input vector image in FIG. 22A but also any of a pattern (i) containing noise, a pattern (ii) including a partial defect, a pattern (iii) whose absolute position is deviated, and a pattern (iv) whose size differs from the original size.

Application to Image Processing

The recognition of a motion pattern in the precessing section 2 enables the main infomation processing section 3 to extract image signal data having a peculiar relationship to the relevant motion.

This extraction is enabled in the following manner. When the vector "image" generated in VP 105 is to be transferred to the main information processing section 3 by the transfer block 107, binary coding is effected onto the phase of the output pulse of each processor element 43 of each hypercolumn, that is, the position on time axis of the output pulse of each processor element 43 with respect to the instant of time that the oscillation of the reference supplying block 101 reaches its maximum amplitude. In the present embodiment, since a pulse assumes eight different positions, the position of the output pulse of each processor element 43 may be transmitted as a 3-bit signal for each picture element to the main information processing section 3.

When the result of processing executed by the memory block 106 is to be transferred to the main information processing section 3, the transfer block 108 transfers the output oscillation of the processor elements 44 to the main information processing section 3 through a comparator or the like. In this case, oscillation which reaches a certain threshold may be converted into a pulse signal and the position of the pulse may be binary-coded. Accordingly, as shown in FIG. 24, the main information processing 3 is able to input, from the preprocessing section 2 via the input block 300, featured data (for example, the data of of the dotted "dog" of FIG. 1), in order to store them into the memory block 301. Furthermore, the featured data stored in the memory block 301 is read out to be processed by the processor 302. the processed data can be stored in the memory block 301 or visually output to the Output block 303.

In this fashion, only image signal data or vector data upon a portion related to a recognized motion pattern is processed and extracted, thereby enabling compression or integration of the extracted information into useful information, production of a high.speed motion image processing apparatus, and processing and measurement of motion images.

Modifications

The present invention can be variously modified without departing from the scope of the invention.

For example, the aforesaid embodiment contemplates the recognition of four kinds of motion patterns, but recognition of a linear motion may be added to that of the four kinds of motion picture.

The size of the cube of VP 105 is not limited to 4×4×4, and may be changed depending on the exact application.

If the amount of phase shift $\Psi_k$ is made to be a continuous quantity, it is also possible to represent a variety of conceptualized motion patterns.

If the number of motion patterns to be recalled is one, the memory section 6 may employ a single processor element 44 and, in this case, it is not necessary to set the amount of phase shift $\Psi_k$.

It will be understood that the foregoing disclosure of the preferred embodiment is for the purpose of illustration only, and that the present invention embraces all modifications, alternatives and variations as may be included within the spirit and broad scope of the invention as defined by the appended claims.

What is claimed is:

1. A motion-pattern recognition apparatus for recognizing the motion of an object contained in time-varying image data, comprising:

input means arranged for input of time-varying image data;

arithmetic means connected to said input means for computing vectors indicative of local variations in the input time-varying image data;

image forming means connected to said arithmetic means for forming an image corresponding to the motion of the object from said vectors computed by said arithmetic means in accordance with a predetermined rule;

memory means for retrievably storing in advance different kinds of conceptualized meanings of motion;

retrieving means connected to said image forming means and said memory means for retrieving a conceptualized meaning close to the image formed by said image forming means; and rule altering means connected to said retrieving means and said image forming means for altering said predetermined rule on the basis of said conceptualized meaning retrieved by said retrieving means.

2. An apparatus according to claim 1, wherein said arithmetic means further comprises means for disintegrating the direction of the variation in said time-varying image data into candidates for vectors in units of picture elements, said image forming means further comprising a plurality of holonic processing elements for representing said candidates as holonic information.

3. An apparatus according to claim 2, wherein each of said holonic processing elements further comprises a nonlinear oscillator circuit, said holonic information being stored as the amplitude and the phase of oscillation of said nonlinear oscillator circuit.

4. An apparatus according to claim 3, wherein each of said holonic processing elements further comprises a Van del Pol oscillator circuit.

5. An apparatus according to claim 2, wherein said holonic processing elements are coupled in the form of a cube, said arithmetic means being arranged to output said vectors to individual ones of said holonic processing elements, which are comprised in said image forming means, in such manner that said candidates for vectors of one picture element may be stored in a column-like form in said cube and so that said vectors of a direction of the entire image of said motion form a plane in said cube.

6. An apparatus according to claim 5, wherein each of said holonic processing elements further comprises a nonlinear oscillator circuit and an oscillation controlling circuit for receiving an input from the nonlinear oscillator circuit of another holonic processing element and then for generating from said input a signal for controlling the oscillation of its own nonlinear oscillator circuit, said holonic processing elements in said column being coupled to each other so that one of said holonic processing elements which stores information representative of motion in one direction and the other which stores information representative of motion in the opposite direction may mutually suppress the oscillations of the respective oscillator circuits.

7. An apparatus according to claim 5, wherein each of said holonic processing elements further comprises a nonlinear oscillator circuit and an oscillation controlling circuit for receiving an output from the nonlinear oscillator circuit of another holonic processing element and then for generating from said output a signal for controlling the oscillation of its own nonlinear oscillator circuit, said oscillator circuit of each of said holonic processing elements which belong to one plane in said cube and said oscillation controlling circuit of each of said holonic processing elements belonging to a different plane in said cube being coupled to each other in such manner that a variation in oscillation between adjacent planes may be made smooth, and said rule altering means being arranged to alter said predetermined rule by altering the amount of control of each of said oscillation controlling circuits.

8. An apparatus according to claim 1, wherein said memory means further comprises a plurality of nonlinear oscillator circuits each storing information representative of a conceptualized meaning as the phase of oscillation of said nonlinear oscillator circuit.

9. An apparatus according to claim 5, wherein said memory means further comprises a plurality of nonlinear oscillator circuits, each of which stores information representative of a conceptualized meaning as the phase of oscillation of said nonlinear oscillator circuit, said retrieving means being arranged to retrieve the desired one from among said conceptualized meanings by determining whether or not the phenomenon of entrainment between said nonlinear oscillator circuits in said memory means is caused by the output signals of said nonlinear oscillator circuits in said cube which is comprised in said image forming means.

10. An image processing apparatus for extracting image data related to the motion of an object from physical data nd effecting image processing of the extracted image data, comprising:
input means arranged to photograph an object and input time-varying image data relation to the object;
arithmetic means connected to said input means for computing vectors indicative of local variations in the input time-varying image data;
image forming means connected to said arithmetic means for forming an image corresponding to the motion of the object from said vectors input from said arithmetic means in accordance with a predetermined rule;
memory means for retrievably storing in advance different kinds of conceptualized meanings of motion;
retrieving means connected to said image forming means and said memory means for retrieving a conceptualized meaning close to said image formed by said image forming means;
means for extracting signal information from said image forming means;
means for selectively extracting said conceptualized meanings; and image processing means for effecting image processing on the basis of said extracted signal information and said extracted conceptualized meanings.

11. An apparatus according to claim 6, wherein the intensity of the suppression between oscillator circuits changes smoothly.

12. An apparatus according to claim 6, wherein said oscillation controlling means further comprises an amplifying means connected to said non-linear oscillator circuits of said holonic elements.

13. A motion-patterned recognition apparatus for recognizing the motion of an object contained in time-varying image data, comprising:
input means arranged to input time-varying image data;
arithmetic means connected to said input means for computing vectors indicative of local variation in the input time-varying image data;
vector altering means connected to said arithmetic means for altering the vectors by interaction therebetween in accordance with a predetermined rule;
memory means for retrievably storing in advance different kinds of conceptualized meanings of motion; and
retrieving means connected to said vector altering means and said memory means for retrieving a conceptualized meaning close to a motion represented by said vectors altered by said vector altering means.

14. An apparatus according to claim 13, wherein said input means comprises a camera.

15. An apparatus according to claim 13, wherein said arithmetic means further comprises sampling means for sampling frames from the time-varying data at two different points of time.

16. An apparatus according to claim 13, wherein said arithmetic means further comprises means for disintegrating the direction of the variation in the time-varying image data into candidates for vectors in units of picture elements.

17. An apparatus according to claim 16, wherein said vector altering means comprises a plurality of holonic processing elements for representing said candidates for vectors as holonic information.

18. An apparatus according to claim 17, wherein each of said holonic processing elements further comprises a nonlinear oscillator circuit, the holonic information being stored as the amplitude and the phase of oscillation of said nonlinear oscillator circuits.

19. An apparatus according to claim 17, wherein said holonic processing elements are coupled in the form of a cube.

20. An apparatus according to claim 19, wherein said arithmetic means is arranged to output each of the candidates for vectors to individual ones of said holonic processing elements, which are comprised in said vector altering means, in such manner that said candidates for vectors of one picture element may be stored in a column-like form in said cube and in such manner that said vectors of a direction of the entire image of said motion form a plane in said cube.

21. An apparatus according to claim 20, wherein each of said holonic processing elements further comprises a nonlinear oscillator circuit and an oscillation controlling circuit for receiving an output from the nonlinear oscillator circuit of another holonic processing element and then for generating from said output a signal for controlling the oscillation of its own nonlinear oscillator circuit.

22. An apparatus according to claim 20, wherein said holonic processing elements in said column-like form are coupled to each other in such manner that the oscillation of each of said holonic processing elements in suppressed by the oscillation of another processing element which receives a vector opposite to its own.

23. An apparatus according to claim 20, wherein said oscillator circuit of each of said holonic processing elements which belong to one plane in said cube and said holonic processing elements belonging to a different plane in said cube are coupled to each other in such manner that a variation in oscillation between adjacent planes may be made smooth.

24. An apparatus according to claim 13, wherein said memory means further comprises a plurality of nonlinear oscillator circuits, each of which stores information representative of a conceptualized meaning as the phase of oscillation of said nonlinear oscillator circuit.

25. An apparatus according to claim 20, wherein said memory means further comprises a plurality of nonlinear oscillator circuits, each of which stores information representative of a conceptualized meaning as the phase of oscillation of said nonlinear oscillator circuit, said retrieving means being arranged to retrieve the desired one from among said conceptualized meaning by determining whether or not the phenomenon of entrainment between said nonlinear oscillator circuit in said memory means is caused by the output signal of said nonlinear oscillator circuits in said cube which is comprised in said vector altering means.

26. A motion-pattern recognition apparatus for recognizing the motion of an object contained in image data, comprising:
   camera means for inputting image data;
      arithmetic means connected to said input means for computing vector indicative of local variation in the input image data;
   vector altering means connected to said arithmetic means for altering the vectors by interaction therebetween;
   memory means for storing in advance different kinds of conceptualized meanings of motion;
   determining means connected to said vector altering means and said memory mans for determining a conceptualized meaning close to a motion represented by the vectors altered by said vector altering means;
   means for extracting signal information from said vector altering means;
   means for selectively extracting said conceptualized meanings; and
   image processing means for effecting image processing on the basis of the extracted signal information and the extracted conceptualized meaning.

* * * * *

UNITED STATES PATENT AND TRADEMARK OFFICE
CERTIFICATE OF CORRECTION

PATENT NO. : 5,067,160
DATED : November 19, 1991
INVENTOR(S) : SATOSHI OMATA, ET AL.

Page 1 of 5

It is certified that error appears in the above-identified patent and that said Letters Patent is hereby corrected as shown below: On the title page

IN [56] REFERENCES CITED

Insert:     --FOREIGN PATENT DOCUMENTS 220077   4/87    E.P.O.
            288332   10/88   E.P.O.
            183622   6/88    E.P.O. --.

Under OTHER PUBLICATIONS, "pp. 225-239" should read --pp. 325-333--.

IN [57] ABSTRACT

Line 14, "holonic-loop" should read --holonic loop--.

COLUMN 1

Line 47, "break" should read --to break--.

COLUMN 3

Line 20, "del" should read --der--.

COLUMN 4

Line 30, "time space" should read --time-space--.
Line 36, "del" should read --der--.

COLUMN 5

Line 30, "self.organic" should read --self-organic--.

UNITED STATES PATENT AND TRADEMARK OFFICE
CERTIFICATE OF CORRECTION

PATENT NO. : 5,067,160
DATED : November 19, 1991
INVENTOR(S) : SATOSHI OMATA, ET AL.

It is certified that error appears in the above-identified patent and that said Letters Patent is hereby corrected as shown below:

COLUMN 6

Line 9, "above.described" should read --above-described--.
Line 18, "visually" should read --which visually--.

COLUMN 8

Line 47, "Pre-Processing" should read --Preprocessing--.

COLUMN 9

Line 33, "del" should read --der--.
Line 53, "non.linear" should read --non-linear--.

COLUMN 10

Line 35, "(Refer" should read --(refer--.
Line 44, "del" should read --der--.
Line 47, "del" should read --der--.
Line 50, "del" should read --der--.
Line 51, "51.325.333;" should read --51.325-333;--.
Line 56, "del" should read --der--.

COLUMN 11

Line 12, "del" should read --der--.
Line 29, "mesh like" should read --mesh-like--.
Line 54, "direction," should read --directions,--.
Line 55, "direction," should read --directions,--.(1st occurr)
Line 67, "represent" should read --represents--.

UNITED STATES PATENT AND TRADEMARK OFFICE
CERTIFICATE OF CORRECTION

PATENT NO. : 5,067,160
DATED : November 19, 1991
INVENTOR(S) : SATOSHI OMATA, ET AL.

It is certified that error appears in the above-identified patent and that said Letters Patent is hereby corrected as shown below:

COLUMN 12

Line 30, "thirty two" should read --thirty-two-- and "32=4X4X8)" should read --32=4X8)--.
    Line 38, "del" should read --der--.

COLUMN 14

Line 7, "are" should read --is--.
    Line 28, "constitutes" should read --constitute--.
    Line 40, "processor" should read --processor element--.
    Line 41, "73abelong" should read --73a belong--.
    Line 44, "r+1-numbered" should read --r-1-numbered--.
    Line 48, "interference"acts" should read --interference" acts--.

COLUMN 15

Line 19, "provide" should read --provides--.
    Line 40, "(Refer" should read --(refer--.

COLUMN 16

Line 44, "an" should read --a--.
    Line 57, "del" should read --der-- and "serves" should read --serve--.

COLUMN 17

Line 8, "direction" should read --directions--.
    Line 27, "mction" should read --motion--.
    Line 28, "del" should read --der--.
    Line 30, "del" should read --der--.
    Line 38, "del" should read --der--.
    Line 52, "has" should read --have--.

UNITED STATES PATENT AND TRADEMARK OFFICE
CERTIFICATE OF CORRECTION

PATENT NO. : 5,067,160
DATED : November 19, 1991
INVENTOR(S) : SATOSHI OMATA, ET AL.

Page 4 of 5

It is certified that error appears in the above-identified patent and that said Letters Patent is hereby corrected as shown below:

COLUMN 18

Line 2, "WXP," should read --EXP,--.
Line 30, "to" (second occurrence) should be deleted.

COLUMN 19

Line 31, "further-noted" should read --further noted--.
Line 56, "an" should read --a--. (1st occurr)

COLUMN 20

Line 31, "Motion Pattern" should read --Motion-Pattern--.
Line 33, "motion pattern" should read --motion-pattern--.
Line 51, "an" should read --a--.

COLUMN 21

Line 12, "infomation" should read --information--.
Line 40, "of" (second occurrence) should be deleted.
Line 44, "the" (first occurrence) should read --The--.
Line 45, "Output" should read --output--.
Line 50, "high.speed" should read --high-speed--.

COLUMN 22

Line 50, "del" should read --der--.

COLUMN 23

Line 45, "nd" should read --and--.
Line 48, "relation" should read --related--.

UNITED STATES PATENT AND TRADEMARK OFFICE
CERTIFICATE OF CORRECTION

PATENT NO. : 5,067,160
DATED : November 19, 1991
INVENTOR(S) : SATOSHI OMATA, ET AL.

It is certified that error appears in the above-identified patent and that said Letters Patent is hereby corrected as shown below:

COLUMN 24

Line 11, "motion-patterned" should read --motion-pattern--.

COLUMN 25

Line 6, "in" should read --is--.
Line 27, "meaning" should read --meanings--.

COLUMN 26

Line 9, "vector" should read --vectors--.
Line 18, "mans" should read --means--.

Signed and Sealed this

Twentieth Day of April, 1993

Attest:

MICHAEL K. KIRK

*Attesting Officer*   Acting Commissioner of Patents and Trademarks